(12) United States Patent
Ono et al.

(10) Patent No.: US 7,224,695 B2
(45) Date of Patent: May 29, 2007

(54) ROUTER AND COMMUNICATION NETWORK SYSTEM

(75) Inventors: Hideaki Ono, Kawasaki (JP); Kazuyuki Oka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 10/061,015

(22) Filed: Jan. 30, 2002

(65) Prior Publication Data
US 2003/0053453 A1  Mar. 20, 2003

(30) Foreign Application Priority Data
Sep. 17, 2001 (JP) ............................. 2001-282108

(51) Int. Cl.
*H04L 12/56* (2006.01)
(52) U.S. Cl. ...................... 370/401; 370/469
(58) Field of Classification Search ...................... None
See application file for complete search history.

(56) References Cited

U.S. PATENT DOCUMENTS

| | | | | |
|---|---|---|---|---|
| 6,728,365 | B1* | 4/2004 | Li et al. ...................... | 379/329 |
| 6,765,927 | B1* | 7/2004 | Martin et al. ................. | 370/469 |
| 2002/0015395 | A1* | 2/2002 | Karagiannis ................. | 370/338 |
| 2002/0021680 | A1* | 2/2002 | Chen ........................... | 370/331 |
| 2002/0085494 | A1* | 7/2002 | Seddigh et al. .............. | 370/235 |
| 2002/0150062 | A1* | 10/2002 | Zheng et al. ................. | 370/331 |

FOREIGN PATENT DOCUMENTS

EP  1 032 179 A1  2/1999

OTHER PUBLICATIONS

Terzis, et al., "RSVP Operation Over IP Tunnels" IETF RFC 2746, Jan. 2000, pp. 1-25, XP-002237919.
Terzis, et al., "A Simple QoS Signaling Protocol for Mobile Hosts in the Integrated Services Internet" Infocom 99, 1999 IEEE, pp. 1011-1018.
Perkins, "IP Mobility Support for IPV4, Revised Draft-IETF-MobileIP-RFC2002-BIS-07.TXT" Aug. 21, 2001 IETF Internet Draft, XP-002265160, pp. 1-95.

* cited by examiner

*Primary Examiner*—Duc Ho
(74) *Attorney, Agent, or Firm*—Katten Muchin Rosenman LLP

(57) ABSTRACT

In a router and a communication network system reserving network resources in compliance with an RSVP (Resource ReSerVation Protocol), that is a protocol for resource reservation, a router stores an encapsulated destination address associated with an address of a second host upon encapsulating and transferring a packet addressed to the second host, transfers a first path message transmitted from a first host to make a resource reservation in compliance with a resource reservation protocol, obtains thereafter the encapsulated destination address from the address of the second host, and transmits a second path message in a non-capsulated state to make a resource reservation with the same communication quality as that of the first path message to the encapsulated destination address.

30 Claims, 38 Drawing Sheets

FIG.4B  HA'S STATE

| REFERENCE CHARACTER | PATH STATE | | | RESERVATION STATE | BINDING CACHE | |
|---|---|---|---|---|---|---|
| | DESTINATION ADDRESS | PHOP | | DESTINATION ADDRESS | KEY | CARE-OF ADDRESS (CoA) |
| ST11 | NONE | NONE | | NONE | | |
| ST12 | MN'S HOME ADDRESS | R1'S ADDRESS | | NONE | MN'S HOME ADDRESS | CoA UNDER R2 |
| ST13 | MN'S HOME ADDRESS | R1'S ADDRESS | | MN'S HOME ADDRESS | MN'S HOME ADDRESS | CoA UNDER R2 |
| ST14 | CoA UNDER R2 | HA'S ADDRESS | | MN'S HOME ADDRESS | MN'S HOME ADDRESS | CoA UNDER R2 |
| | MN'S HOME ADDRESS | R1'S ADDRESS | | MN'S HOME ADDRESS | MN'S HOME ADDRESS | CoA UNDER R2 |
| ST17 | CoA UNDER R2 | HA'S ADDRESS | | CoA UNDER R2 | MN'S HOME ADDRESS | CoA UNDER R2 |

FIG.6B HAS STATE

| REFERENCE CHARACTER | PATH STATE | | RESERVATION STATE | BINDING CACHE | |
|---|---|---|---|---|---|
| | DESTINATION ADDRESS | PHOP | DESTINATION ADDRESS | KEY | CARE-OF ADDRESS (CoA) |
| ST21 | MN'S HOME ADDRESS | R1'S ADDRESS | NONE | NONE | NONE |
| ST22 | MN'S HOME ADDRESS | R1'S ADDRESS | MN'S HOME ADDRESS | NONE | NONE |
| ST23 | MN'S HOME ADDRESS<br>CoA UNDER R2 | R1'S ADDRESS<br>HA'S ADDRESS | MN'S HOME ADDRESS | MN'S HOME ADDRESS | CoA UNDER R2 |
| ST26 | MN'S HOME ADDRESS<br>CoA UNDER R2 | R1'S ADDRESS<br>HA'S ADDRESS | MN'S HOME ADDRESS<br>CoA UNDER R2 | MN'S HOME ADDRESS | CoA UNDER R2 |

FIG.11A  HA'S STATE

| REFERENCE CHARACTER | PATH STATE | | RESERVATION STATE | | BINDING CACHE | |
|---|---|---|---|---|---|---|
| | DESTINATION ADDRESS | PHOP | DESTINATION ADDRESS | PHOP | KEY | CARE-OF ADDRESS (CoA) |
| ST30 | NONE | NONE | NONE | | | |
| ST32 | MN'S HOME ADDRESS | R1'S ADDRESS | NONE | | MN'S HOME ADDRESS | MN'S VCoA UNDER MA |
| ST33 | MN'S HOME ADDRESS | R1'S ADDRESS | MN'S HOME ADDRESS | | MN'S HOME ADDRESS | MN'S VCoA UNDER MA |
| ST34 | MN'S VCoA UNDER MA | R1'S ADDRESS | MN'S HOME ADDRESS | | MN'S HOME ADDRESS | MN'S VCoA UNDER MA |
| ST37 | MN'S HOME ADDRESS | R1'S ADDRESS | MN'S HOME ADDRESS | | | |
| | MN'S VCoA UNDER MA | HA'S ADDRESS | MN'S VCoA UNDER MA | | MN'S HOME ADDRESS | MN'S VCoA UNDER MA |

FIG.11B  MA'S STATE

| REFERENCE CHARACTER | PATH STATE | | RESERVATION STATE | | BINDING CACHE | | |
|---|---|---|---|---|---|---|---|
| | DESTINATION ADDRESS | PHOP | DESTINATION ADDRESS | PHOP | KEY | VCoA | CARE-OF ADDRESS(CoA) |
| ST31 | NONE | NONE | NONE | | | | |
| ST35 | MN'S VCoA UNDER MA | HA'S ADDRESS | MN'S VCoA UNDER MA | | MN'S HOME ADDRESS | VCoA UNDER MA | MN'S PCoA UNDER R2 |
| ST36 | MN'S VCoA UNDER MA | HA'S ADDRESS | MN'S VCoA UNDER MA | | MN'S HOME ADDRESS | VCoA UNDER MA | MN'S PCoA UNDER R2 |
| ST38 | MN'S PCoA UNDER R2 | MA'S ADDRESS | MN'S VCoA UNDER MA | | MN'S HOME ADDRESS | VCoA UNDER MA | MN'S PCoA UNDER R2 |
| ST41 | MN'S VCoA UNDER MA | HA'S ADDRESS | MN'S VCoA UNDER MA | | MN'S HOME ADDRESS | VCoA UNDER MA | MN'S PCoA UNDER R2 |
| | MN'S PCoA UNDER R2 | MA'S ADDRESS | MN'S PCoA UNDER R2 | | MN'S HOME ADDRESS | VCoA UNDER MA | MN'S PCoA UNDER R2 |

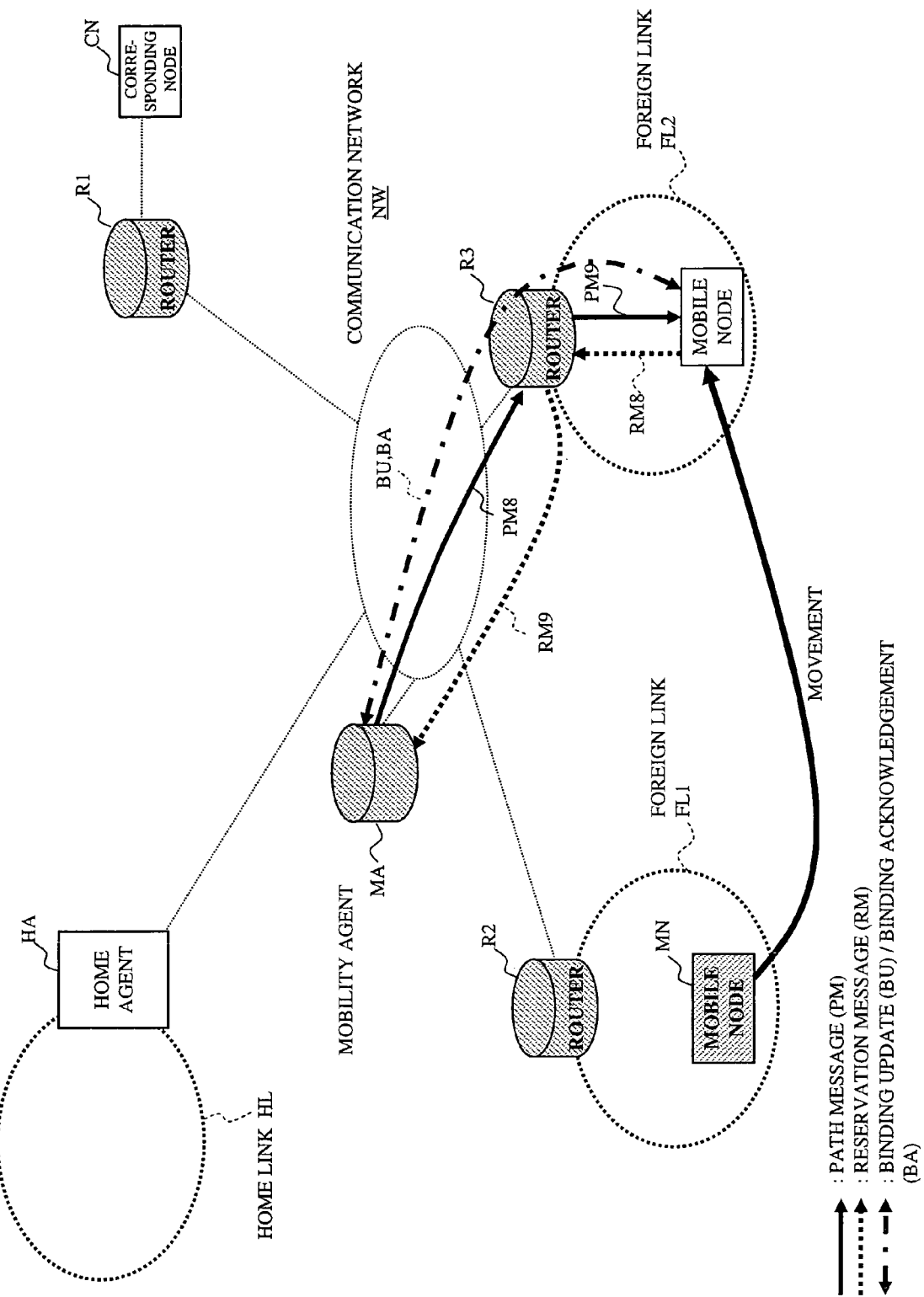

FIG.13B MA'S STATE

| REFERENCE CHARACTER | PATH STATE | | | RESERVATION STATE | BINDING CACHE | | |
|---|---|---|---|---|---|---|---|
| | DESTINATION ADDRESS | PHOP | | DESTINATION ADDRESS | KEY | VCoA | CARE-OF ADDRESS(CoA) |
| ST51 | MN'S VCoA UNDER MA | HA'S ADDRESS | | MN'S VCoA UNDER MA | MN'S HOME ADDRESS | VCoA UNDER MA | PCoA UNDER R2 |
| | MN'S PCoA UNDER R2 | MA'S ADDRESS | | MN'S PCoA UNDER R2 | | | |
| ST52 | MN'S VCoA UNDER MA | HA'S ADDRESS | | MN'S VCoA UNDER MA | MN'S HOME ADDRESS | VCoA UNDER MA | PCoA UNDER R3 |
| | MN'S PCoA UNDER R2 | MA'S ADDRESS | | MN'S PCoA UNDER R2 | | | |
| ST53 | MN'S VCoA UNDER MA | HA'S ADDRESS | | MN'S VCoA UNDER MA | MN'S HOME ADDRESS | VCoA UNDER MA | PCoA UNDER R3 |
| | MN'S PCoA UNDER R2 | MA'S ADDRESS | | MN'S PCoA UNDER R2 | | | |
| | MN'S PCoA UNDER R3 | MA'S ADDRESS | | | | | |
| ST56 | MN'S VCoA UNDER MA | HA'S ADDRESS | | MN'S VCoA UNDER MA | MN'S HOME ADDRESS | VCoA UNDER MA | PCoA UNDER R3 |
| | MN'S PCoA UNDER R2 | MA'S ADDRESS | | MN'S PCoA UNDER R2 | | | |
| | MN'S PCoA UNDER R3 | MA'S ADDRESS | | MN'S PCoA UNDER R3 | | | |

FIG.15B  R1'S STATE

| REFERENCE CHARACTER | PATH STATE | | | RESERVATION STATE | BINDING CACHE | |
|---|---|---|---|---|---|---|
| | DESTINATION ADDRESS | PHOP | | DESTINATION ADDRESS | KEY | CARE-OF ADDRESS(CoA) |
| ST61 | MN'S HOME ADDRESS | CN'S ADDRESS | | MN'S HOME ADDRESS | NONE | NONE |
| ST62 | MN'S HOME ADDRESS | CN'S ADDRESS | | MN'S HOME ADDRESS | MN'S HOME ADDRESS | CoA UNDER R2 |
| | CoA UNDER R2 | R1'S ADDRESS | | | | |
| ST65 | MN'S HOME ADDRESS | CN'S ADDRESS | | MN'S HOME ADDRESS | MN'S HOME ADDRESS | CoA UNDER R2 |
| | CoA UNDER R2 | R1'S ADDRESS | | CoA UNDER R2 | | |

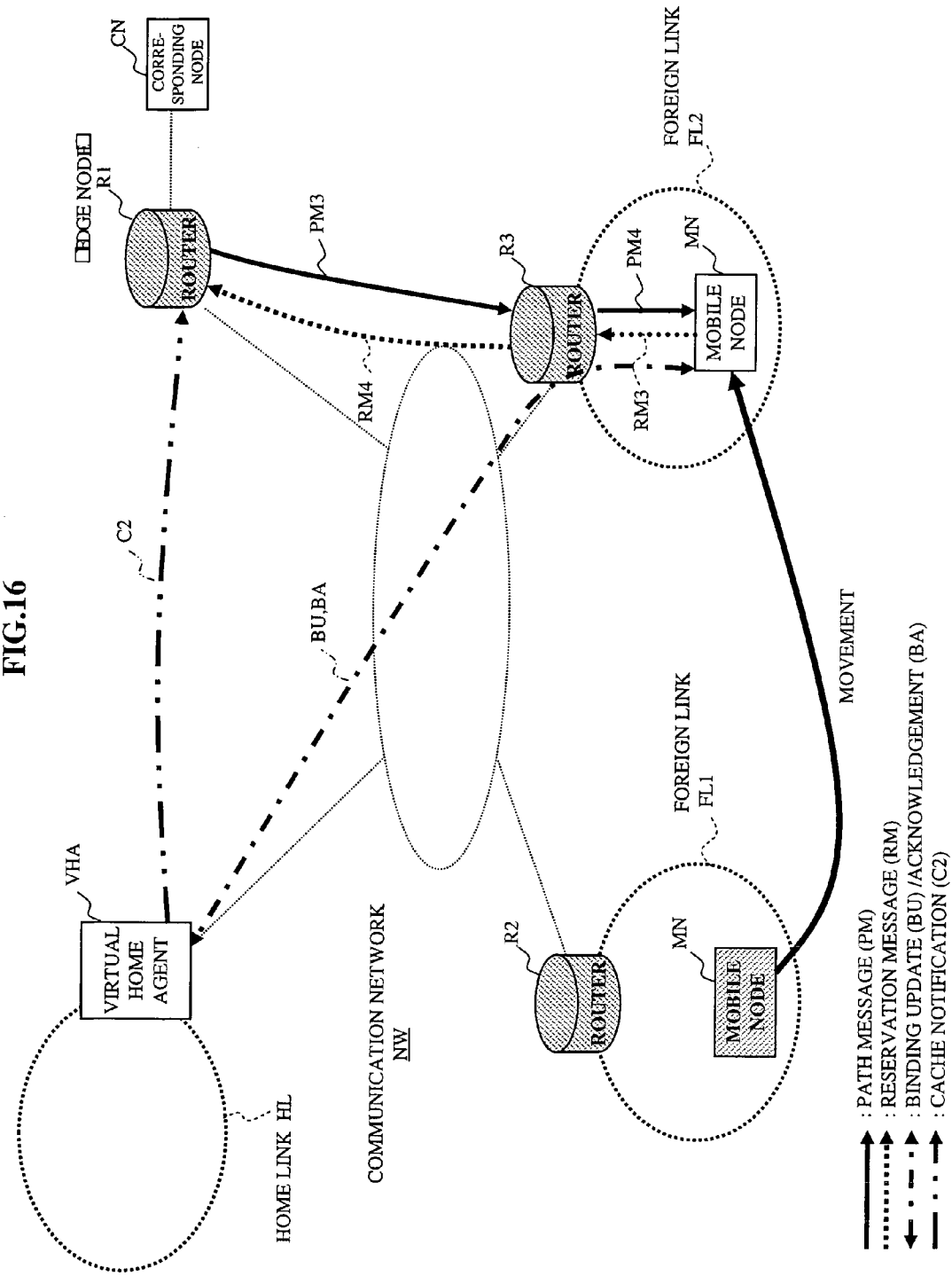

FIG.17B R1'S STATE

| REFERENCE CHARACTER | PATH STATE | | RESERVATION STATE | | BINDING CACHE | |
|---|---|---|---|---|---|---|
| | DESTINATION ADDRESS | PHOP | DESTINATION ADDRESS | | KEY | CARE-OF ADDRESS(CoA) |
| ST71 | MN'S HOME ADDRESS | CN'S ADDRESS | MN'S HOME ADDRESS | | MN'S HOME ADDRESS | CoA UNDER R2 |
| | CoA UNDER R2 | R1'S ADDRESS | CoA UNDER R2 | | | |
| ST73 | MN'S HOME ADDRESS | CN'S ADDRESS | MN'S HOME ADDRESS | | MN'S HOME ADDRESS | CoA UNDER R3 |
| | CoA UNDER R2 | R1'S ADDRESS | CoA UNDER R2 | | | |
| | CoA UNDER R3 | R1'S ADDRESS | CoA UNDER R3 | | | |
| ST76 | MN'S HOME ADDRESS | CN'S ADDRESS | MN'S HOME ADDRESS | | MN'S HOME ADDRESS | CoA UNDER R3 |
| | CoA UNDER R2 | R1'S ADDRESS | CoA UNDER R2 | | | |
| | CoA UNDER R3 | R1'S ADDRESS | | | | |

FIG.19B R2'S STATE

| REFERENCE CHARACTER | PATH STATE | | | RESERVATION STATE |
|---|---|---|---|---|
| | DESTINATION ADDRESS | PHOP | | DESTINATION ADDRESS |
| ST82 | MN1'S ADDRESS | R1'S ADDRESS | | NONE |
| ST83 | MN1'S ADDRESS | R1'S ADDRESS | | MN1'S ADDRESS |
| ST88 | MN1'S ADDRESS | R1'S ADDRESS | | MN1'S ADDRESS |
| | R2'S ADDRESS | R3'S ADDRESS | | |

FIG.19C R1'S STATE

| REFERENCE CHARACTER | PATH STATE | | RESERVATION STATE |
|---|---|---|---|
| | DESTINATION ADDRESS | PHOP | DESTINATION ADDRESS |
| ST81 | MN1'S ADDRESS | CN1'S ADDRESS | NONE |
| ST84 | MN1'S ADDRESS | CN1'S ADDRESS | MN1'S ADDRESS |
| ST85 | MN1'S ADDRESS | CN1'S ADDRESS | MN1'S ADDRESS |
| | R2'S ADDRESS | R2'S ADDRESS | |
| ST91 | MN1'S ADDRESS | CN1'S ADDRESS | MN1'S ADDRESS |
| | R2'S ADDRESS | R1'S ADDRESS | R2'S ADDRESS |

| DESTINATION ADDRESS | ENCAPSULATED DESTINATION | ID |
|---|---|---|
| MN1 | R2 | 1 |
|  |  |  |

FIG.23B R2'S STATE

| REFERENCE CHARACTER | PATH STATE | | | RESERVATION STATE |
|---|---|---|---|---|
| | DESTINATION ADDRESS | PHOP | ID | DESTINATION ADDRESS |
| ST102 | MN1'S ADDRESS | R1'S ADDRESS | 1 | NONE |
| ST103 | MN1'S ADDRESS | R1'S ADDRESS | 1 | MN1'S ADDRESS |
| ST108 | MN1'S ADDRESS | R1'S ADDRESS | 1 | MN1'S ADDRESS |
| | R2'S ADDRESS | R3'S ADDRESS | | |

FIG.23C R1'S STATE

| REFERENCE CHARACTER | PATH STATE | | | RESERVATION STATE |
|---|---|---|---|---|
| | DESTINATION ADDRESS | PHOP | ID | DESTINATION ADDRESS |
| ST101 | MN1'S ADDRESS | CN1'S ADDRESS | | NONE |
| ST104 | MN1'S ADDRESS | CN1'S ADDRESS | | MN1'S ADDRESS |
| ST105 | MN1'S ADDRESS | CN1'S ADDRESS | | MN1'S ADDRESS |
| | R2'S ADDRESS | R1'S ADDRESS | 1 | |
| ST111 | MN1'S ADDRESS | CN1'S ADDRESS | 1 | MN1'S ADDRESS |
| | R2'S ADDRESS | R1'S ADDRESS | | R2'S ADDRESS |

| DESTINATION ADDRESS | ENCAPSULATED DESTINATION |
|---|---|
| MN1 | R2 |
| MN2 | R2 |
|  |  |
|  |  |
|  |  |
|  |  |

← ENCRYPTION REGION →

ROUTER AND COMMUNICATION NETWORK SYSTEM

BACKGROUND OF THE INVENTION

1. Field of the Invention

The present invention relates to a router and a communication network system, and in particular to a router and a communication network system reserving network resources in compliance with an RSVP (Resource ReSerVation Protocol), that is a protocol for resource reservation.

2. Description of the Related Art

Application Examples of RSVP

In the RSVP, each router transferring packets between a first and a second host makes a reservation (resource reservation) of quality of service (QoS) provided.

FIG. 24 shows an example of a general resource reservation by the RSVP. In this example, a communication network NW is composed of routers R1-R3 and a home agent HA, and a first host CN is connected to the router R1. It is to be noted that the home agent HA is a router as well.

Also, a mobile node MN is a terminal having an address used in a home link HL, which can move to a foreign link FL1 managed by the router R2 or to a foreign link FL2 managed by the router R3 in addition to a home link HL managed by the home agent HA.

In the example shown, the mobile node MN is located in the home link HL, while the router R1 and the home agent HA transfer a packet addressed to the mobile node MN from a corresponding node CN.

Hereinafter, the procedure by which the corresponding node CN in this state makes a resource reservation in compliance with the RSVP before transmitting an ordinary packet will be described.

(1) The corresponding node CN transmits to the mobile node MN a path message PM1 having set therein an address of the node itself as an RSVP_HOP (occasionally referred to as PHOP since IP address of Previous HOP (PHOP) is generally used). The router R1 having received the path message PM1 holds the information therein as a path state.

As contents of a general path state, session information (destination address (DestAddress), a protocol ID (Protocol_ID), a destination port number (DestPort)), the RSVP_HOP, and the like are used. As a path state in the router R1 shown, the PHOP is the address of the corresponding node CN, and the destination is the home address of the mobile node MN.

The router R1 sets the address of its own in the PHOP of the path message PM1 to be transferred as a path message PM2 to the mobile node MN.

(2) The home agent HA having received the path message PM2 generates and holds a path state based thereon in which the PHOP is the address of the router R1 and the destination is the home address of the mobile node MN.

Moreover, the home agent HA sets the address of its own in the PHOP of the path message PM2 to be transferred as a path message PM3 to the mobile node MN.

(3) The mobile node MN having received the path message PM3 generates and holds a path state based thereon in which the PHOP is the address of the home agent HA and the destination is the home address of the mobile node MN, and transmits a reservation message RM1 in response to the path message PM3.

It is to be noted that the destination of the reservation message RM1 is the PHOP stored in the path message PM3.

(4) The home agent HA having received the reservation message RM1 holds the information of the reservation message RM1 as a reservation state, so that a service quality upon transferring a packet transmitted from the corresponding node CN can be provided. It is to be noted that the reservation state includes session information, resource reservation information, and the like.

Moreover, the home agent HA transmits a reservation message RM2 to the address of the router R1 that is the PHOP of the path state held.

(5) The router R1 having received the reservation message RM2 holds the information of the reservation message RM2 as a reservation state, and further transmits a reservation message RM3 addressed to the corresponding node CN that is the PHOP of the path state held.

By the above-mentioned procedures (1)-(5), the resource reservation is made for all of the routers supporting the RSVP between the corresponding node CN and the mobile node MN, namely, the router R1 and the home agent HA in this case. It is to be noted that the corresponding node CN can recognize that the resource reservation has been completed by receiving the reservation message RM3.

Various Forms of Encapsulation-and-transfer

Meanwhile, examples of using a technology of an encapsulation-and-transfer in the communication network will be described hereinafter.

(A) Encapsulation-and-transfer in General Mobile IP

In a general mobile IP, when the mobile node MN moves from the home link HL, the home agent HA generates an entry associating the mobile node MN with its care-of address (hereinafter, occasionally abbreviated as CoA) in a binding cache, so that a packet addressed to the mobile node MN arriving thereafter from the corresponding node CN is encapsulated and transferred (hereinafter, simply and occasionally referred to as "encapsulated") to the care-of address.

Also, when the link in which the mobile node MN is located is changed by moving, the mobile node MN receives a new router advertisement from the connected router, so that a new care-of address is generated again.

Thereafter, the mobile node MN notifies the change of the care-of address to the home agent HA using a binding update message. Upon receiving the binding update, the home agent HA updates the corresponding entry of the binding cache, so that the packet addressed to the mobile node MN from the corresponding node CN arriving thereafter is encapsulated to the new care-of address.

In a communication network having applied thereto such a general mobile IP, an example where the home agent HA encapsulates a packet destined for the home address of the mobile node MN with the care-of address of the mobile node MN to be transferred will be described referring to FIG. 25. The arrangement of FIG. 25 is the same as that of FIG. 24, except that FIG. 25 shows a state where the mobile node MN has moved to the foreign link FL1 managed by the router R2.

(1) Firstly, the corresponding node CN transmits a packet M1 to the mobile node MN. In this case, the corresponding node CN knows only the home address of the mobile node MN, so that the destination of the packet M1 indicates the home address of the mobile node MN.

(2) When the packet M1 reaches the home agent HA through the router R1, the home agent HA retrieves the binding cache, reads the care-of address (CoA) of the mobile node MN, and encapsulates the packet M1 with the care-of address as the destination, to be transferred as a packet M2.

(3) When the encapsulated packet M2 reaches the mobile node MN through the router R2, the mobile node MN takes out the original packet M1 by decapsulating the packet M2.

(B) Encapsulation-and-transfer in Hierarchical Mobile IP System

In contrast to the above-mentioned general mobile IP, there is a hierarchical mobile IP system (described as "Hierarchical MIPv6" in the IETF draft "draft-ietf-mobileip-hmipv6-04.txt") in which a mobility agent MA equivalent to an agent for the home agent HA is provided aside from the home agent HA, whereby the movement of the mobile node MN within the network managed by the mobility agent MA is concealed from the home agent HA.

FIG. 26 shows such a hierarchical mobile IP system, having an arrangement where the mobility agent MA is added to the arrangement of FIG. 25.

In such a hierarchical mobile IP system, the binding cache of the home agent HA associates the home address of the mobile node MN with a virtual care-of address (VCoA) under the mobility agent MA.

Also, the mobility agent MA associates the home address of the mobile node MN with a physical care-of address (PCoA) under the router where the mobile node MN is actually located, e.g. the router R2.

In this case, the mobile node MN transmits the binding update not to the home agent HA but to the mobility agent MA as far as the movement is within the network managed by the mobility agent MA.

Thus, it seems to the home agent HA as if the mobile node MN is located under the mobility agent MA.

Hereinafter, the encapsulation-and-transfer in such a hierarchical mobile IP system will be described referring to FIG. 26.

(1) The corresponding node CN transmits a packet M1 to the mobile node MN.
(2) When the packet M1 reaches the home agent HA through the router R1, the home agent HA retrieves the binding cache, reads the virtual care-of address (VCoA) of the mobile node MN, and encapsulates the packet M1 with the care-of address as the destination, to be transferred as a packet M2.
(3) The mobility agent MA having received the encapsulated packet M2 encapsulates it again, or re-encapsulates it, destined for the physical care-of address (PCoA) in the network to which the mobile node MN has moved, to be transferred as a packet M3.
(4) The mobile node MN having received the encapsulated packet M3 destined for the PCoA through the router R2 takes out the original packet M1 by decapsulation.

(C) Mobile IP System Using Edge Node

Hereinafter, a mobile IP system using an edge node will be described referring to FIG. 27 in which a virtual home agent VHA and an edge node EN are respectively substituted for the home agent HA and the router R1 in FIG. 24.

In this case, the edge node EN provided in a position nearer to the corresponding node CN than the virtual home agent VHA copies the binding cache of the virtual home agent VHA upon arrival of the packet, retrieves the binding cache instead of the virtual home agent VHA, and performs the encapsulation processing, thereby optimizing a transferring route within the network.

Also, the virtual home agent VHA (occasionally referred to as a temporary home agent (THA) when applied to the above-mentioned hierarchical mobile IP) has a function of the home agent HA and a function of delivering the binding cache to the edge node EN.

Hereinafter, an example of the encapsulation-and-transfer in the mobile IP system using the edge node will be described referring to FIG. 27.

(1) The corresponding node CN transmits a packet M1 to the mobile node MN.
(2) When the packet M1 reaches the virtual home agent VHA through the edge node EN, the virtual home agent VHA retrieves the binding cache, reads the care-of address (CoA) of the mobile node MN, and encapsulates the packet M1 with the care-of address as the destination, to be transferred as a packet M2.
(3) The encapsulated packet M2 reaches the mobile node MN through the router R2.
(4) The edge node EN having transferred the packet M1 in the above-mentioned (1) transmits a cache request C1 addressed to the transferring destination, i.e. the home address of the mobile node MN.
(5) The virtual home agent VHA having received the cache request C1 returns a binding cache associated with the mobile node MN by a cache notification C2 to the edge node EN, in the presence of a binding cache corresponding to the destination.
(6) The edge node EN having received the cache notification C2 generates and holds a binding cache associated with the home address of the mobile node MN.
(7) Hereafter, the corresponding node CN transmits a packet M3 to the home address of the mobile node MN.
(8) The edge node EN refers to the binding cache, and encapsulates the packet destined for the home address of the mobile node MN with the care-of address CoA as the destination, to be transferred as a packet M4.
(9) The mobile node MN having received the encapsulated packet M4 destined for the PCoA through the router R2 takes out the original packet M3 by decapsulation.

(D) Encapsulation-and-transfer in IP-VPN

Apart from the communication network using mobile IP in the above-mentioned (A)-(C), the encapsulation-and-transfer is performed in an IP-VPN (Internet Protocol-Virtual Private Network), that is a virtual private network service restricting the transmission protocol to the IP.

FIGS. 28A and 28B show an example of the IP-VPN using a tunnel mode of an IPsec (IP security). As shown in FIG. 28A, terminals CN1-CN3 and MN1-MN3 are respectively connected to gateways GW1 and GW2. The gateways GW1 and GW2 respectively have stored therein encapsulation tables TBL1 and TBL2 to be referred upon an encapsulation.

Also, an encapsulation-and-transfer section between the gateways GW1 and GW2 is composed of e.g. routers R1-R6 as shown in FIG. 28B. It is to be noted that the routers R1 and R2 are the gateway routers respectively corresponding to the gateways GW1 and GW2, so that in the following explanation, the gateways GW1 and GW2 are occasionally represented by the routers R1 and R2.

In such an IP-VPN, e.g. a packet transmitted from the terminal CN1 to the terminal MN1 is encapsulated at the gateway GW1. At this time, the gateway GW1 (router R1) refers to the encapsulation table TBL1 in which the destination address and an encapsulated destination are associated with each other as shown in FIG. 29, and encapsulates the packet addressed to the terminal MN1 with the destination of the router R2, to be transferred.

The encapsulated packet has, for example, a packet format of the tunnel mode of the IPsec as shown in FIG. 30. An encryption region of the packet format shown in FIG. 30 is a region where an ESP trailer is added to an original IP header, an original expanded header, a TCP header, and data composing the packet before the encapsulation.

An ESP header and ESP authentication data are added to this encryption region, and a new expanded header and a new IP header are further added thereto.

The gateway GW2 (router R2) recovers the original packet by decapsulating the received packet, to be transmitted to the terminal MN1.

The first problem when making the resource reservation in compliance with the RSVP is that when the encapsulated transfer of the packet is performed as in the above-mentioned (A)-(D), the path message transmitted when making the resource reservation in compliance with the RSVP is also encapsulated.

FIG. 31 shows a case supposing that the corresponding node CN makes a resource reservation in a state where the mobile node MN has moved to the foreign link FL1 in the same way as in FIG. 25.

In this case, the operations of the corresponding node CN, the router R1, the home agent HA, and the mobile node MN are the same as those of FIG. 24, except that in FIG. 31, the path message PM3 transferred by the home agent HA to the mobile node MN is encapsulated through the router R2 since the mobile node MN has moved to the foreign link FL1.

The encapsulated path message PM3 can be decapsulated only by the mobile node MN which is the destination, so that the router R2 on the way treats the path message PM3 as an ordinary packet. Namely, a path state is not generated by the router R2. Therefore, the router R2 does not generate a reservation state when transferring the reservation message RM1 from the mobile node MN to the home agent HA.

Thus, in FIG. 31, the resource reservation can be made in the router R1 and in the home agent HA, but can not be made in the router R2. However, the corresponding node CN receives the reservation message RM3 in the same way as in FIG. 24. Therefore, although it seems as if the resource reservation is completed, as a matter of fact, the operation will be continued by a service quality different from what was requested.

Similar problems arise in the hierarchical mobile IP system shown in FIG. 26, and in the mobile IP using the edge node shown in FIG. 27.

Also, as shown in FIG. 32, when the resource reservation is made between the transmitting terminal CN1 and the second host MN1 in the IP-VPN, the resource reservation is made by the path messages PM1-PM3 and the reservation messages RM1-RM3 as follows:

(1) The path message PM1 from the transmitting terminal CN1 is encapsulated by the router R1, to be encapsulated as a path message PM2 to the router R2. At this time, the router R1 generates and holds a path state wherein the PHOP is the address of the transmitting terminal CN1, and the destination is the address of the second host MN1.

(2) The router R2 having received the path message PM2 through the routers R4 and R3 decapsulates the path message PM2. While transmitting the path message PM3 to the second host MN1, the router R2 generates and holds a path state wherein the PHOP is the address of the router R1, and the destination is the address of the second host MN1.

(3) When the second host MN1 transmits a reservation message RM1 in response to the path message PM3, the router R2 having received the reservation message RM1 generates and holds a reservation state wherein the destination is the address of the second host. Also, the reservation message RM1 is encapsulated as the reservation message RM2 addressed to the router R1.

(4) The router R1 having received the reservation message RM2 through the routers R3 and R4 decapsulates the reservation message RM2. While transmitting a reservation message RM3 to the transmitting terminal CN1, the router R1 generates and holds a reservation state wherein the destination is the address of the second host MN1.

Thus, the routers R1 and R2 hold the path states and reservation states, so that the resource reservation is made. However, the routers R3 and R4 transferring the encapsulated path message PM2 and the reservation message RM2 do not make the resource reservation.

Specifically, when the path message PM2 and the reservation message RM2 are encrypted packets as shown in FIG. 30, the routers R3 and R4 on the way can not make the resource reservation since the determination or the decoding of the message is not possible.

The second problem in making the resource reservation in compliance with the RSVP is that in a mobile communication system, even if a normal resource reservation is made, when the mobile node MN moves, the communication will be continued without making a resource reservation between the home agent and the moving destination of the mobile node MN.

Such an example will be described referring to FIG. 33. FIG. 33 shows a case similar to FIG. 24 in which the mobile node MN moves to the foreign link FL1 after the completion of the resource reservation by the path messages PM1-PM3 and the reservation messages RM1-RM3 in the state where the mobile node MN has been located in the home link HL.

In this case, the router R1 holds a path state in which the PHOP is the address of the corresponding node CN and the destination is the home address of the mobile node MN as shown by (1) in FIG. 33, as well as a reservation state in which the destination is the home address of the mobile node as shown by (5) in FIG. 33.

Also, the home agent HA holds a path state in which the PHOP is the address of the router R1 and the destination is the home address of the mobile node MN as shown by (2) in FIG. 33, as well as a reservation state in which the destination is the home address of the mobile node MN as shown by (4) in FIG. 33.

Furthermore, while being located in the home link HL, the mobile node MN holds a path state in which the PHOP is the address of the home agent and the destination is the home address of the mobile node MN as shown by (3) in FIG. 33.

When the mobile node MN moves to the foreign link FL1 in such a state, a packet M1 transmitted thereafter from the corresponding node CN to the mobile node MN reaches the mobile node MN as a packet M2 having encapsulated by the home agent HA.

In this case, the resource reservation is not made in the router R2, so that the service by the requested service quality is not provided. Also, although the router R1 having made the resource reservation in advance provides the service, there is a problem that the home agent HA does not provide the service since the destination of the encapsulation-and-transfer at the home agent HA assumes the care-of address of the mobile node MN which is different from the home address of the mobile node MN, that is the address when the resource reservation was made.

SUMMARY OF THE INVENTION

It is accordingly an object of the present invention to solve the above-mentioned first and the second problems, and to provide a router and a communication network system making a reservation of network resources in compliance with an RSVP (Resource ReSerVation Protocol) that is a resource reservation protocol in which a resource reservation within a section where a packet is encapsulated is made possible.

[1] In order to achieve the above-mentioned object, a router according to the present invention comprises: transferring means for transferring a first path message transmitted from a first host to a second host to make a resource reservation in compliance with a resource reservation protocol, and a first reservation message transmitted from the second host to the first host in response to the first path message; storage means for storing an encapsulated destination address associated with an address of the second host upon encapsulating and transferring a packet addressed to the second host; and proxy resource reservation means for obtaining the encapsulated destination address from the address of the second host, and for transmitting a second path message in a non-capsulated state to make a resource reservation with a same communication quality as tat of the first path message to the encapsulated destination address.

Namely, transfer means transfer a first path message transmitted from a first host, e.g. a transmitting terminal, to a second host, e.g. a receiving terminal, to make a resource reservation in compliance with a resource reservation protocol, and a first reservation message in response thereto. Also, storage means store an encapsulated destination address associated with an address of the second host upon encapsulating and transferring a packet addressed to the second host.

Moreover, proxy resource reservation means obtain the encapsulated destination address from the address of the second host, and transmit a second path message in a non-capsulated state to make a resource reservation with a same communication quality as that of the first path message to the encapsulated destination address.

By this second path message, the resource reservation with the same contents as those of the first path message is made in a section (encapsulation-and-transfer section) between the router and the point of the encapsulated destination address.

Thus, the resource reservation can be made in a section where the first path message is encapsulated.

In this case, the second host may comprise a mobile node, which may comprise a mobile terminal including a portable terminal, a notebook-type terminal, or a fixed-type terminal.

Also, in the router according to the present invention, when the storage means newly store or update the encapsulated destination address in association with the address of the second host by receiving a location registering message from the second host after the resource reservation between the first and the second host is made, the proxy resource reservation means may transmit the second path message in a non-capsulated state to the encapsulated destination address newly stored or updated.

By this second path message, the resource reservation with the same communication quality as that of the first path message is made in a section (encapsulation-and-transfer section) between the router and the point of the encapsulated destination address after the location registration.

Thus, even if a section where the packet addressed to the second host is encapsulated newly arises by the movement of the second host after the resource reservation is made between the first host and the second host, the resource reservation in this section can be made.

Also, in the router according to the present invention, the transferring means may transfer the second path message transmitted by another router and a second reservation message in response to the second pat message, the storage means may store the encapsulated destination address and a re-encapsulated destination address associated with the address of the second host, and the proxy resource reservation means may obtain the re-encapsulated destination address from the encapsulated destination address, and may transmit a third path message in a noncapsulated state to make a resource reservation with a same communication quality as that of the second pat message to the re-encapsulated destination address.

By this third path message, the resource reservation with the same communication quality as that of the second path message, namely, the same communication quality as that of the first path message, is made in an encapsulation-and-transfer section between the router and the point of the re-encapsulated destination address after the location registration.

Thus, the resource reservation in an encapsulation-and-transfer section, in case the second path message transmitted from another router is re-encapsulated, can be made.

In this case, when the storage means update the re-encapsulated destination address stored in association with the address of the second host by receiving a location registering message from the second host after the resource reservation is made between the first and the second host the proxy resource reservation means may resend the third path message in a non-capsulated state to the updated re-encapsulated destination address.

By this third path message, the resource reservation with the same communication quality as that of the second pat message, namely, the same communication quality as that of the first path message, is made in an encapsulation-and-transfer section between the router and the point of the re-encapsulated destination address after the location registration.

Thus, even if a section where the packet addressed to the second host is encapsulated newly arises by the movement of the second host after the resource reservation is made between the first host and second host, the resource reservation in this section can be made.

Also, the router according to the present invention may be provided in a position nearer to the first host, and after receiving information associating the address of the second host with the encapsulated destination address as a cache notification from another router, may encapsulate and transfer a packet addressed to the second host to the encapsulated destination address, and when the cache notification is received after the resource reservation between the first and the second host is made, the proxy resource reservation means may transmit the second path message in a non-capsulated state to the encapsulated destination address.

By this second path message, the resource reservation with the same communication quality as that of the first path message is made in a section (encapsulation-and-transfer section) between the router and the point of the encapsulated destination address after the location registration.

Thus, the resource reservation in a section where the packet is encapsulated can be made, even in case of a router provided in a position nearer to the first host which is able to shorten the transfer route by encapsulating the packet addressed to the second host.

In this case, the router according to the present invention may request the other router to transmit the cache notification, or the other router may transmit the cache notification upon receipt of a location registering message from the second host.

Also, in the router according to the present invention, the above-mentioned proxy resource reservation means may determine whether or not the resource reservation between the first and the second host is made based on a generation state of a path state generated by the transferring means upon receipt of the first or the second path message, or of a reservation state generated by the transferring means upon receipt of the first or the second reservation message.

Namely, the transfer means generate a path state upon receipt of the first or the second path message, and generate a reservation state upon receipt of first or the second reservation message. The proxy resource reservation means determine whether or not the resource reservation between the first and the second host is made based on a generation state of a path state or a reservation state.

Also, in the router according to the present invention, upon storing a same encapsulated destination address associated with a plurality of the second host addresses, the storage means may store an identifier capable of uniquely identifying an attribute of a received packet per address of each second host in combination with the same encapsulated destination address, and the transferring means and the proxy resource reservation means may respectively include the identifier in an encapsulation header upon encapsulating and transferring the received packet and in the second path message.

Thus, for a plurality of second hosts, the resource reservation in a section where the packet is encapsulated can be made per second host based on the identifier.

In this case, another router may make the resource reservation per identifier based on the identifier.

It is to be noted that the above-mentioned resource reservation protocol may comprise an RSVP.

Also, the router according to the present invention may not transfer but hold the first reservation message until a second reservation message in response to the second path message is received.

Thus, it is made possible to prevent the first host from receiving a notification of completion before the resource reservation in the section where the packet is encapsulated is completed.

Moreover, the router according to the present invention may transmit an error message, when a resource reservation by the second path message has failed, for notifying that the resource reservation was not made, instead of transferring the first reservation message.

Thus, it is made possible to prevent the first host from receiving a notification of completion despite the resource reservation has failed in the section where the packet is encapsulated.

It is to be noted tat the second pat message may be transmitted when the first reservation message is received, while it is possible to transmit the second path message immediately after encapsulating the first path message if the destination in the encapsulation-and-transfer section is preliminarily known.

[2] Also, in order to achieve the above-mentioned object a communication network system according to the present invention comprises: a first host for transmitting a first pat message to make a resource reservation in compliance with a resource reservation protocol; a second host for transmitting a first reservation message to the first host in response to the first path message; and a first router for storing an encapsulated destination address associated with an address of the second host upon encapsulating and transferring a packet addressed to the second host, for obtaining the encapsulated destination address from the address of the second host, and for transmitting a second path message in a non-capsulated state to make a resource reservation with a same communication quality as that of the first path message to the encapsulated destination address.

Namely, a first router transferring a first path message transmitted by a first host to make a resource reservation in compliance with a resource reservation protocol and a first reservation message transmitted in response thereto by a second host to the first host stores an encapsulated destination address associated with an address of the second host upon encapsulating and transferring a packet addressed to the second host.

The first router can recognize that it has encapsulated the first path message if the encapsulated destination address can be obtained from the address of the second host. Therefore, the first router transmits a second path message in a non-capsulated state to make a resource reservation with the same communication quality as that of the first path message in a section where the first path message has been encapsulated to the encapsulated destination address.

Hereafter, the process in compliance with the resource reservation protocol is performed by the second path message in a section (encapsulation-and-transfer section) between the first router and the point of the encapsulated destination address, so that the resource reservation in the encapsulation-and-transfer section is made with the same communication quality as that of the first path message.

The first router transmitting such a second path message means to function as a proxy to the first host for the resource reservation in the encapsulation-and-transfer section.

It is to be noted that if the encapsulated destination address associated with the address of the second host is not stored, the first router is transferring the packet addressed to the second host without encapsulation, so that the first path message also has been transferred without encapsulation. Therefore, the second path message is not transmitted even if the first reservation message is received.

Thus, the resource reservation can be made in a section where the first path message is encapsulated.

In this case, the second host may comprise a mobile node, which may comprise a mobile terminal including a portable terminal, a notebook-type terminal, or a fixed-type terminal.

Also, in the communication network system according to the present invention, when newly storing or updating the encapsulated destination address in association with the address of the second host by receiving a location registering message from the second host after the resource reservation between the first and the second host is made, the first router may transmit the second path message in a non-capsulated state to the encapsulated destination address newly stored or updated.

Namely, when the second host is a mobile node, and the first router has newly stored or updated the encapsulated destination address in association with the address of the second host by receiving a location registering message from the second host, the first router encapsulates and transfers a packet addressed to the second host received thereafter to the encapsulated destination address newly stored or updated.

When the first router receives the location registering message from the second host after the resource reservation is made between the first and the second host, the resource reservation is not made in a section where a packet addressed to the second host is thereafter encapsulated.

Therefore, the first router transmits the second path message in a non-capsulated state to the encapsulated destination address.

Hereafter, the process in compliance with the resource reservation protocol will be performed by the second path message in an encapsulation-and-transfer section between the first router and the point of the encapsulated destination address after a location registration, so that the resource reservation in the encapsulation-and-transfer section is made with the same communication quality as that of the first path message.

Thus, even if a section where the packet addressed to the second host is encapsulated newly arises by the movement of the second host after the resource reservation is made between the first host and second host, the resource reservation in this section can be made.

Also, the communication network system according to the present invention may further comprise a second router provided on a route where a packet addressed to the encapsulated destination address is re-encapsulated and transferred to the second host for storing the encapsulated destination address and a re-encapsulated destination address associated with the address of the second host when the packet is re-encapsulated and transferred, for obtaining the re-encapsulated destination address from the encapsulated destination address, and for transmitting a third path message in a non-capsulated state to make a resource reservation with a seine communication quality as that of the second path message to the re-encapsulated destination address.

Namely, the second router re-encapsulates and transfers a packet destined for the encapsulated destination address to the second host. At this time, the second router stores the encapsulated destination address and the re-encapsulated destination address respectively associated with the address of the second host.

The second router having received a second reservation message transmitted by the above-mentioned first router in response to the second path message can recognize that it has re-encapsulated and transferred the second path message if the re-encapsulated destination address can be obtained by the encapsulated destination address.

Therefore, in order to make the resource reservation in a section where the second path message is re-encapsulated, the second router transmits a third path message in a non-capsulated state to make the resource reservation with a same communication quality as that of the second path message to the re-encapsulated destination address.

Hereafter, the process in compliance with the resource reservation protocol is performed by the third path message in the encapsulation-and-transfer section between the second router and the re-encapsulated destination address, so that the resource reservation in the encapsulation-and-transfer section is made with the same communication quality as that of the second path message.

Thus, the resource reservation in the section where the second pat message transmitted from the first router is re-encapsulated by the second router can be made.

Also, in the communication network system according to the present invention, when the second router updates the re-encapsulated destination address stored in association with the address of the second host by receiving a location registering message from the second host after the resource reservation is made between the first and the second host, the second router may transmit the third path message in a non-capsulated state to the updated re-encapsulated destination address.

Namely, when the second router updates the re-encapsulated destination address stored in association with the address of the second host by receiving a location registering message from the second host, the second router re-encapsulates and transfers the packet destined for the encapsulated destination address received thereafter to the updated re-encapsulated destination address.

When the second router receives a location registering message from the second host after the resource reservation is made between the first and the second host, the resource reservation in a section between the second router and the updated re-encapsulated destination address is not made.

Therefore, the second router transmits the above-mentioned third path message in a non-capsulated state to the updated re-encapsulated destination address.

Hereafter, the process in compliance with the resource reservation protocol will be performed by the third path message in a section (encapsulation-and-transfer section) between the second router and the point of the re-encapsulated destination address, so that the resource reservation in the encapsulation-and-transfer section is made with the same communication quality as that of the second path message.

Thus, even if the second router encapsulates and transfers the packet addressed to the second host to another address by the movement of the second host after the resource reservation is made between the first host and second host, the resource reservation in the section where the packet is encapsulated can be made.

Also, the communication network system according to the present invention may further comprise a second router, provided in a position nearer to the first host, for encapsulating and transferring a packet addressed to the second host to the encapsulated destination address after receiving information associating the address of the second host with the encapsulated destination address as a cache notification from the first router, and for transmitting the second path message in a non-capsulated state to the encapsulated destination address when the cache notification is received after the resource reservation between the first and the second host is made.

Namely, the second router, which is provided in a position nearer to the first host, is able to shorten the transfer route by encapsulating and transferring the packet addressed to the second host. Therefore, the second router receives information associating the address of the second host with the encapsulated destination address as a cache notification from the above-mentioned first router, and thereafter encapsulates and transfers a packet addressed to the second host to the encapsulated destination address.

When the second router receives the cache notification after the resource reservation is made between the first and the second host, the resource reservation is not made in a section between the second router and the point of the encapsulated destination address. Therefore, the second router transmits the second path message in a non-capsulated state for making the resource reservation with the same communication quality as that of the first path message to the encapsulated destination address.

Hereafter, the process in compliance with the resource reservation protocol will be performed by the second path message in a section (encapsulation-and-transfer section) between the second router and the point of the encapsulated destination address, so that the resource reservation in the encapsulation-and-transfer section is made with the same communication quality as that of the first path message.

Thus, the resource reservation in a section where the packet is encapsulated can be made by the second router which is able to transfer the packet addressed to the second host by shortening, or optimizing, the transfer route.

In the communication network system according to the present invention, the first router may transmit the cache notification to the second router in response to a request from the second router, or the first router may transmit the cache notification to the second router upon receipt of a location registering message from the second host.

Also, in the communication network system according to the present invention, the first router or the second router may determine whether or not the resource reservation between the first and the second host is made based on a generation state of a path state generated upon receipt of the first or the second path message, or of a reservation state generated upon receipt of the first or the second reservation message.

Namely, the first or the second router generates a path state upon receipt of the first or the second path message, and a reservation state upon receipt of the first or the second reservation message. Then, the first or the second touter determines whether or not the resource reservation between the first and the second host is made based on a generation state of the path state or the reservation state.

Also, in the communication network system according to the present invention, upon storing a same encapsulated destination address associated with a plurality of the second host addresses, the first router may store an identifier capable of uniquely identifying an attribute of a received packet per address of each second host in combination with the same encapsulated destination address, and may include the identifier in an encapsulation header upon transferring the received packet by encapsulation and in the second path message.

Namely, when the sane encapsulated destination address is associated with a plurality of second host addresses, an identifier stored by the first router for each of the second host addresses in combination with the encapsulated destination address is capable of uniquely identifying an attribute of a received packet per address of each second host. Also, the first router includes the identifier in an encapsulation header upon transferring the received packet by encapsulation and in the header of the second path message.

Thus, for a plurality of second hosts, reservation in a section where the packet is encapsulated can be made per the second host based on the identifier.

In this case, the communication network system according to the present invention may further comprise a second router for making a resource reservation with the second path message, and for making the reservation per identifier.

Namely, the second router makes the resource reservation per identifier included in the header of the second path message.

It is to be noted that the above-mentioned resource reservation protocol may comprise an RSVP.

Also, in the communication network system according to the present invention, the first router may not transfer but hold the first reservation message until a second reservation message in response to the second path message is received.

Thus, it is made possible to prevent the first host from receiving a completion notification before the resource reservation in the section where the packet is encapsulated is completed.

Moreover, in the communication network system according to the present invention, the first router may transmit an error message for notifying that the resource reservation was not made when a resource reservation by the second path message has failed, instead of transferring the first reservation message.

Thus, it is made possible to prevent the first host from receiving a completion notification in spite of the resource reservation in this section where the packets is encapsulated has failed.

BRIEF DESCRIPTION OF THE DRAWINGS

FIG. 6B is a table showing a state of a home agent HA of FIG. 5;

FIG. 11A is a table showing a state of a home agent HA of FIG. 9.

FIG. 11B is a table showing a state of a mobility agent MA of FIG. 9;

FIG. 12 is a network diagram showing a resource reservation (No.2) of an embodiment (2) according to the present invention;

FIG. 13B is a table showing a state of a mobility agent MA of FIG. 12;

FIG. 15B is a table showing a state of a router R1 of FIG. 14;

FIG. 16 is a network diagram showing a resource reservation (No.2) of an embodiment (3) according to the present invention;

FIG. 17B is a table showing a state of a router R1 of FIG. 16;

FIG. 23B is a table showing a state of a router R2;

FIG. 23C is a table showing a state of a router R1;

Throughout the figures, like reference numerals indicate like or corresponding components.

DESCRIPTION OF THE EMBODIMENTS

The above-mentioned present invention will be described separately for [1] an application example to a mobile IP, and [2] an application example to an IP-VPN.

Firstly, an arrangement of a router used in the application examples [1] and [2] will be described referring to FIG. 1. It is to be noted that the term "router" described hereinafter means a home agent HA (including virtual home agent VHA), a mobility agent MA, or an edge node EN in relation to the application example [1], or a gateway router in relation to the application example [2].

Figure 1:
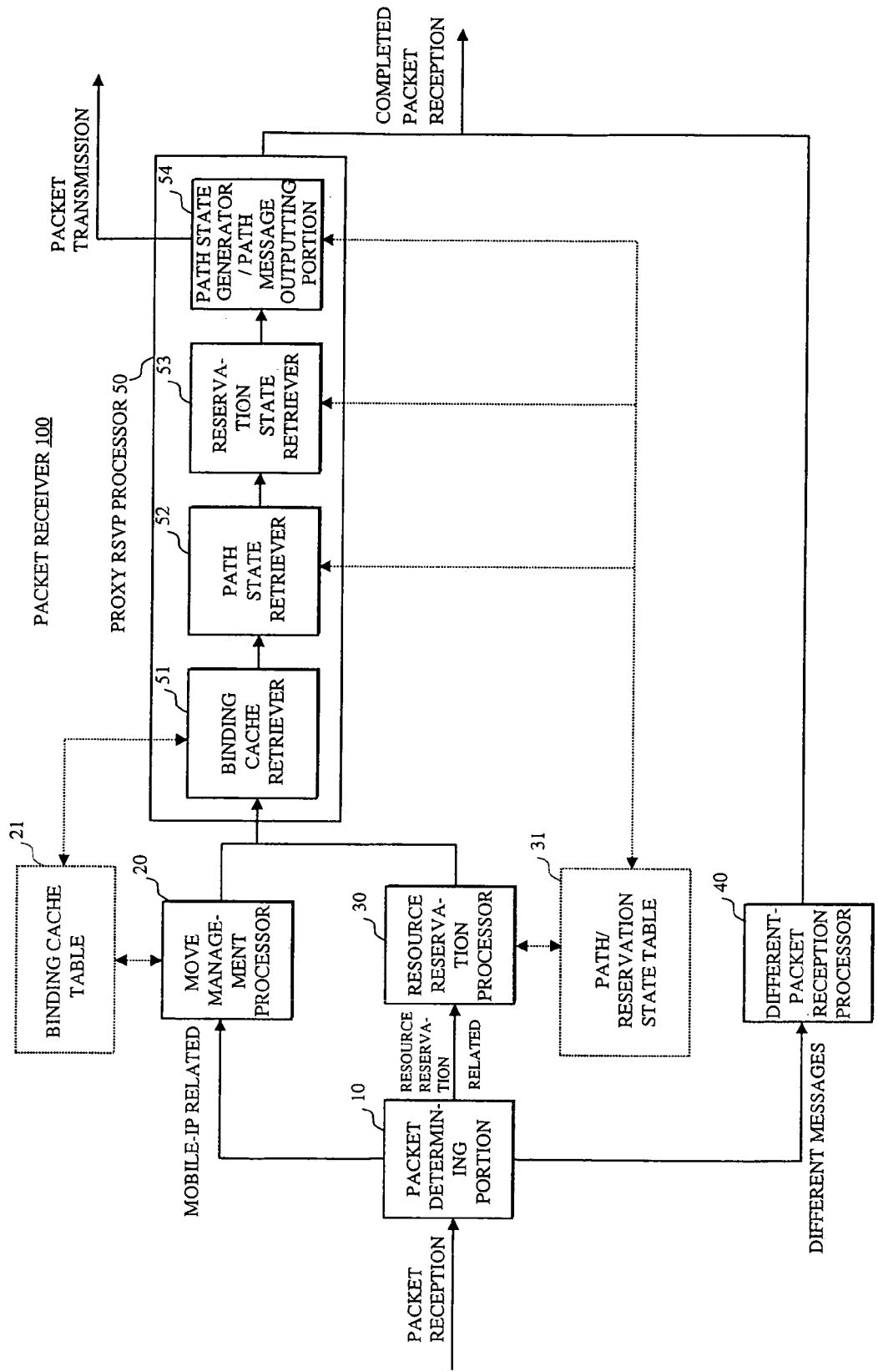
FIG. 1 is a block diagram showing an arrangement of a router in embodiments (1)-(5) according to the present invention.

In the router of the application example [1], as shown in FIG. 1, a packet receiver 100 is composed of a packet determining portion 10, a move management processor 20, a resource reservation processor 30, a different-packet reception processor 40, a proxy RSVP processor 50, a binding cache table 21, and a path/reservation state table 31.

Also, the proxy RSVP processor 50 is composed of a binding cache retriever 51, a path state retriever 52, a reservation state retriever 53, and a path state generator/path message outputting portion 54. The proxy RSVP processor 50 in the present invention makes the resource reservation on behalf of the first host in a packet transferring section where the resource reservation is not fully made by the resource reservation initiated by the first host. Hereinafter, the processing of the proxy RSVP processor 50 will be occasionally referred to as a "proxy RSVP processing".

Figures 29, 30:
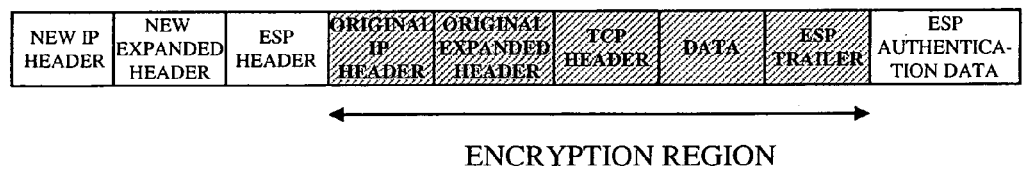
FIG. 29 is a diagram showing an example of a general encapsulation table.
FIG. 30 is a format diagram showing a packet format in a tunnel mode of a general IPsec.

Meanwhile, the router of the application example [2] is not provided with the above-mentioned move management processor 20, while substituting an encapsulation table (see FIG. 29) for the binding cache table 21, and an encapsulation table retriever (not shown) for the binding cache retriever 51.

[1] Application Example to Mobile IP

For the application example [1], an application example to a general mobile IP (embodiment (1)), an application example to a hierarchical mobile IP (embodiment (2)), and an application example to the mobile IP using the edge node (embodiment (3)) will be described.

Figure 2B:
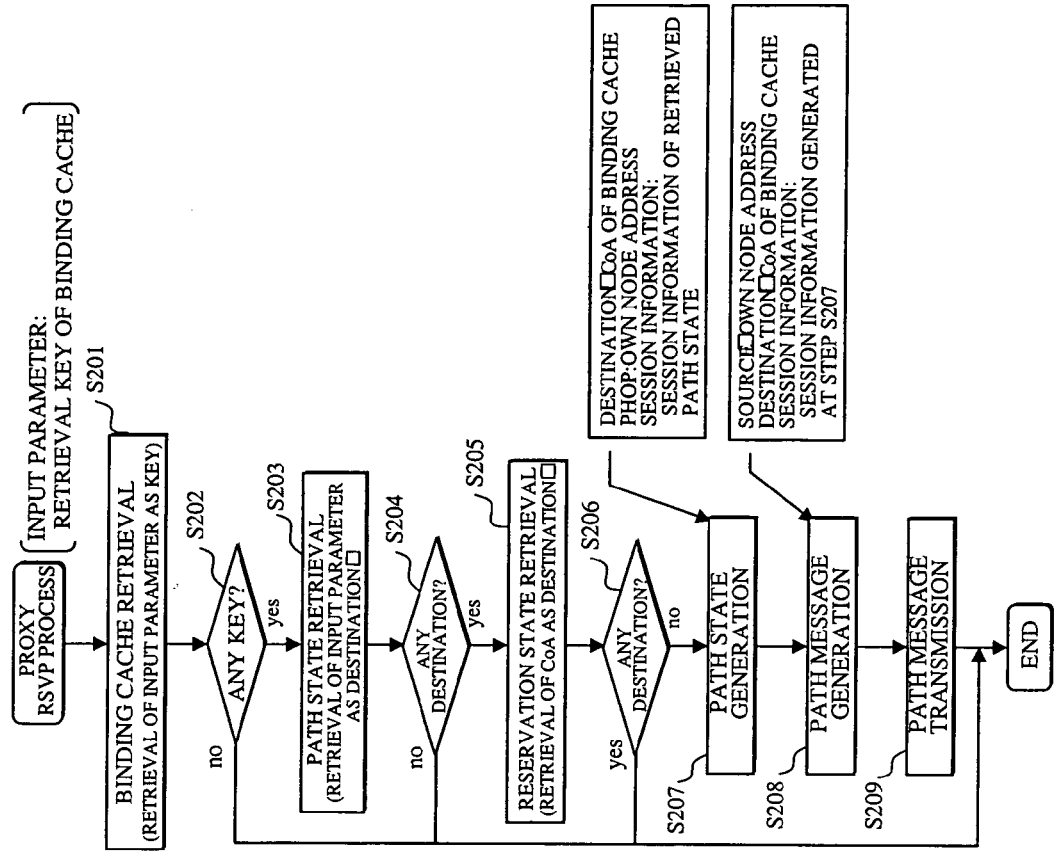
FIGS. 2A and 2B are flow charts showing a processing flow of a home agent HA in embodiments (1)-(3) according to the present invention.
Figure 2A:
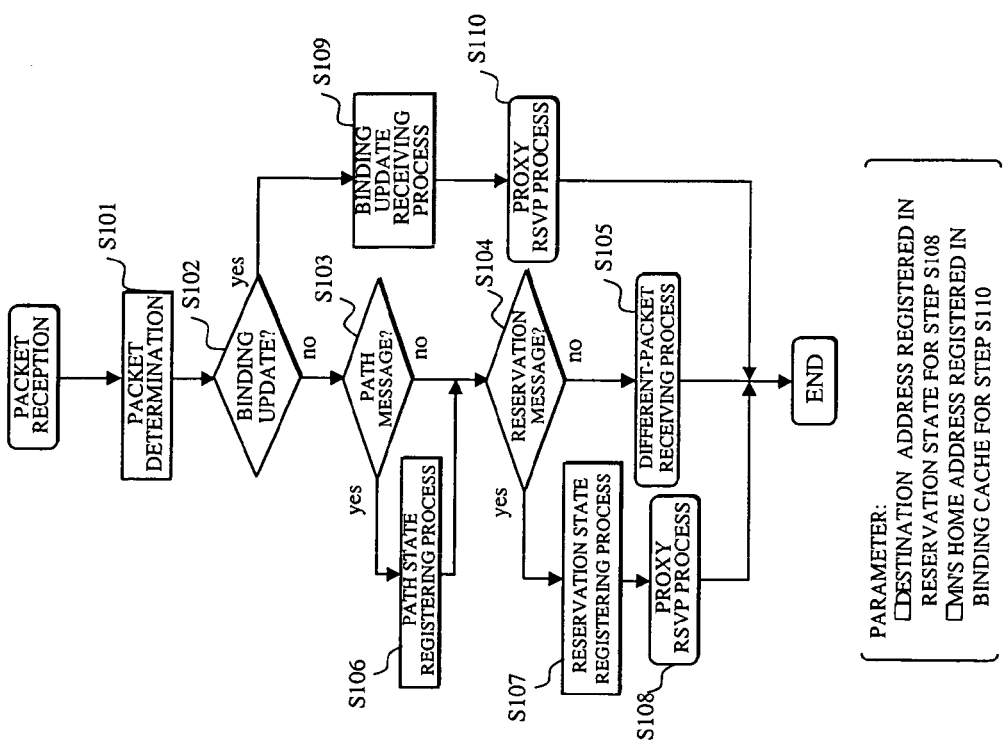

Firstly, a common processing flow of the router in the embodiments (1)-(3) will be described referring to FIGS. 2A and 2B. FIG. 2A shows an overall processing flow of the packet receiver 100 shown in FIG. 1, and FIG. 2B shows the proxy RSVP processing flow of the proxy RSVP processor 50.

Hereinafter, the processing flow for determining the resource reservation state between the home agent HA and the mobile node MN, and for transmitting a message to make a resource reservation of the route in which the resource reservation is not made will be described referring to FIGS. 1, 2A, and 2B, where e.g. the router is the home agent HA.

In the packet receiver 100 of the home agent HA, the packet determining portion 10 determines the type of packet when the packet is received (at step S101 in FIG. 2A), and determines whether or not the received packet is a binding update (mobile IP related packet) (at step S102). If it is the binding update, the move management processor 20 performs a binding update receiving process (at step S109), where the binding cache table 21 is updated.

If it is determined at step S102 that the packet is not the binding cache, the packet determining portion 10 further determines whether or not the received packet is a path message (resource reservation related packet) (at step S103). If it is the path message, the resource reservation processor 30 performs a path state registering process (at step S106), and the path/reservation state table 31 is updated.

If it is determined at step S103 that the packet is not the path message, the packet determining portion 10 further determines whether or not the received packet is a reservation message (resource reservation related packet) (at step S104). If it is the reservation message, the resource reservation processor 30 performs a reservation state registering process (at step S107), and the path/reservation state table 31 is updated.

If it is determined at step S104 that the packet is not the reservation message, the received packet is a different packet, so that the different-packet reception processor 40 performs a different-packet receiving process (at step S105).

After the binding update receiving process (at step S109) by the move management processor 20, and after the reservation state registering process by the resource reservation processor 30 (at step S107), the proxy RSVP processor 50 performs the proxy RSVP processing (at steps S110 and S108).

In this case, the parameter passed to the proxy RSVP processing is the destination address registered in the reservation state as for step S108, and the home address of the mobile node MN registered in the binding cache as for step S110.

In this proxy RSVP process, as shown in FIG. 2B, the binding cache retriever 51 of the proxy RSVP processor 50 firstly retrieves a corresponding entry from the binding cache table 21 with the input parameter as a key (at step S201). In the presence of the corresponding entry (at step S202), the path state retriever 52 retrieves a corresponding entry from the path/reservation state table 31 with the input parameter as a destination address (at step S203).

In the presence of the corresponding entry (at step S204), the reservation state retriever 53 retrieves a corresponding entry from the path/reservation state table 31 with the care-of address of the entry retrieved at step S201 as a destination address (at step S205). In the absence of the corresponding entry (at step S206), the control is transferred to the path state generator/path message outputting portion 54.

The path state generator/path message outputting portion 54 generates a path state in which the destination address is the care-of address of the binding cache, the PHOP is the address of the node itself, and the session information indicates the path state retrieved, and adds the path state to the path state/reservation state table 31 (at step S207). A path message is generated from the path state generated to be transmitted (at steps S208 and S209).

Embodiment 1

In this embodiment (1), the application example to the general mobile IP will be described. Since three types of resource reservation (Nos.1-3) can be made corresponding to the moving state of the mobile node MN, each type will be described.

Figure 3:
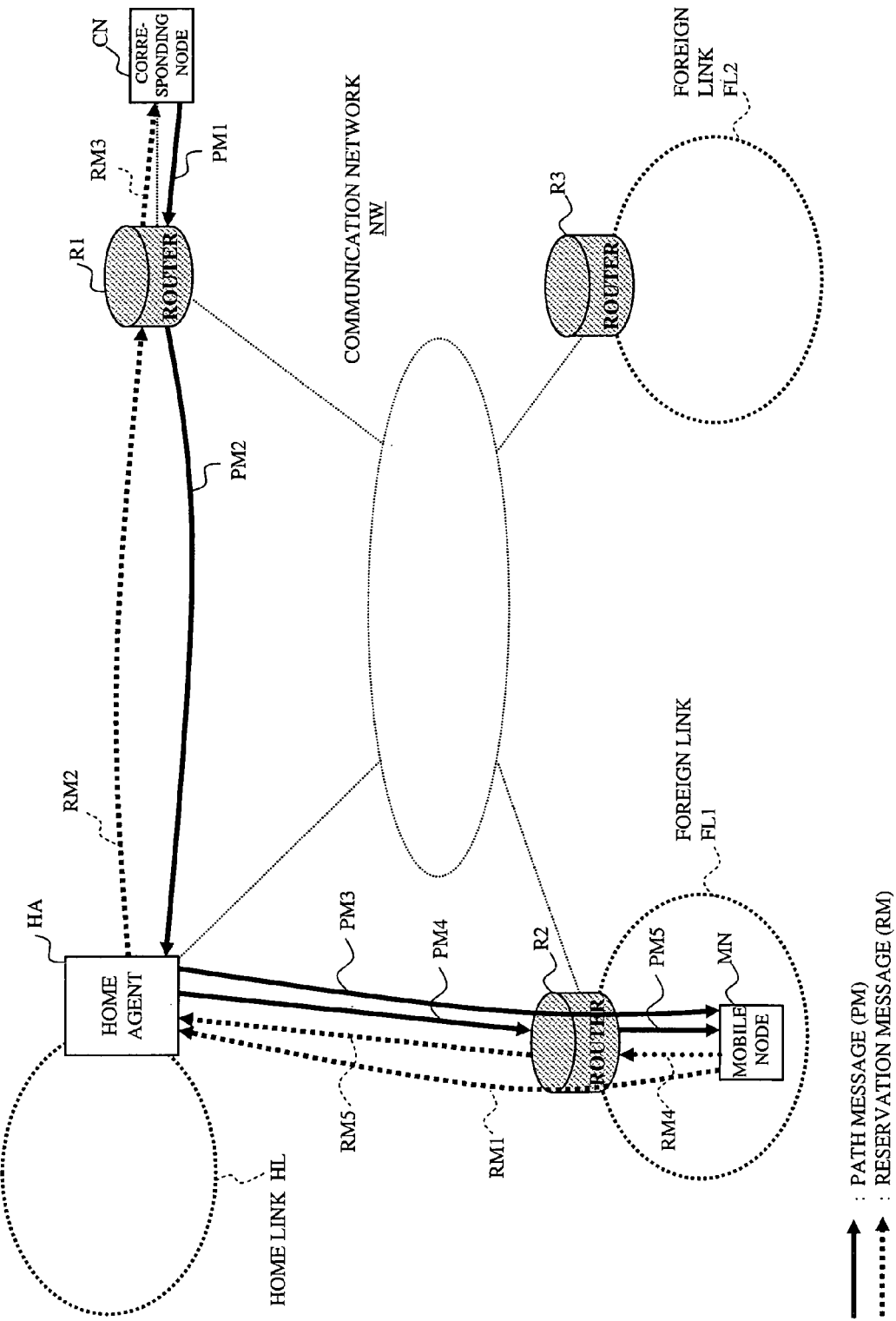
FIG. 3 is a network diagram showing a resource reservation (No.1) of an embodiment (1) according to the present invention.
Figure 4:
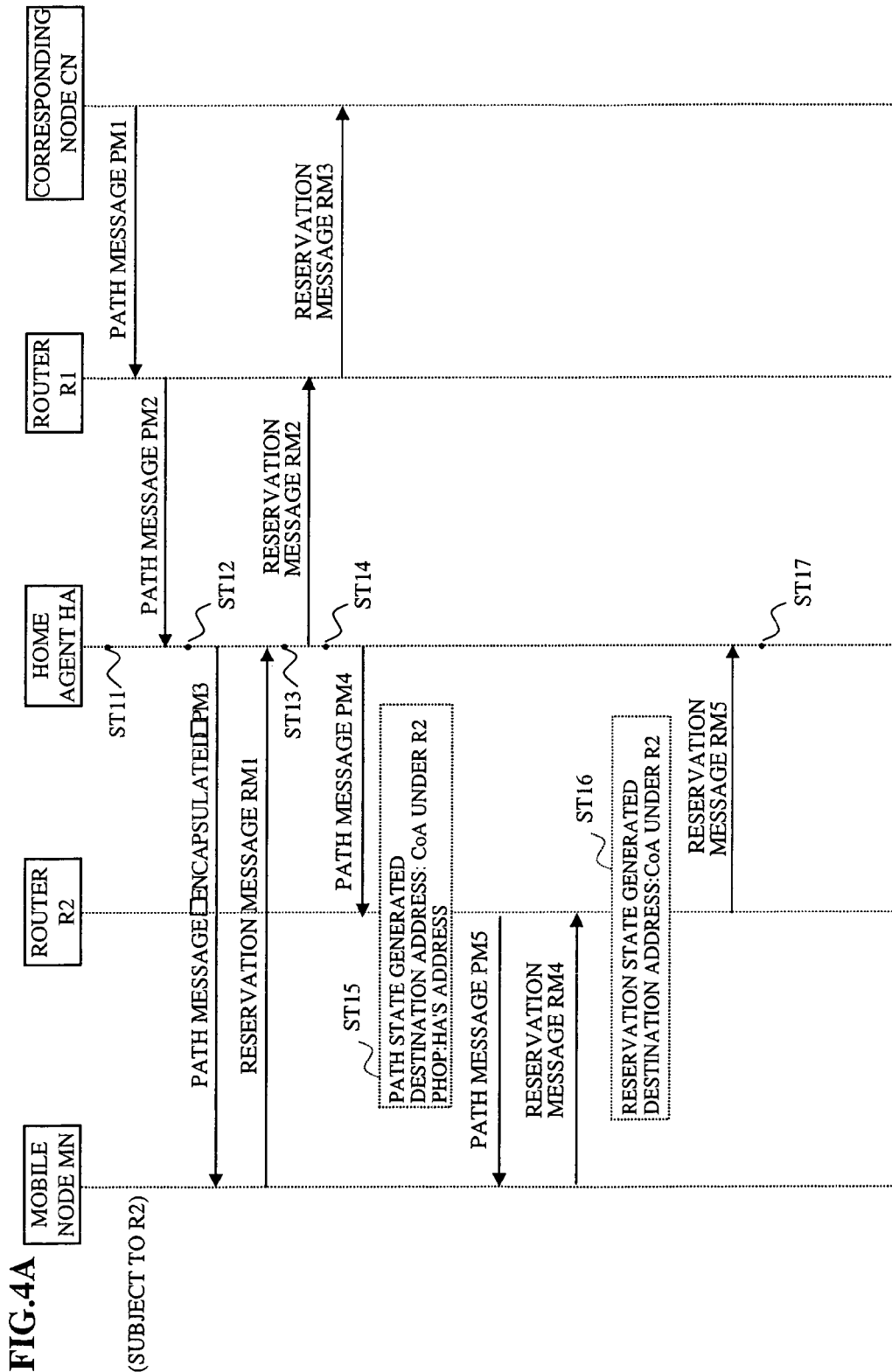
FIG. 4A is a diagram showing a message sequence of FIG. 3.
FIG. 4B is a table showing a state of a home agent HA of FIG. 3.

Resource Reservation (No.1) in Embodiment (1): FIGS. 3, 4A, and 4B

FIGS. 3, 4A, and 4B show a resource reservation procedure in case where the mobile node MN is located in the foreign link FL1 for the resource reservation (No.1) in the embodiment (1) of the present invention.

Figure 31:
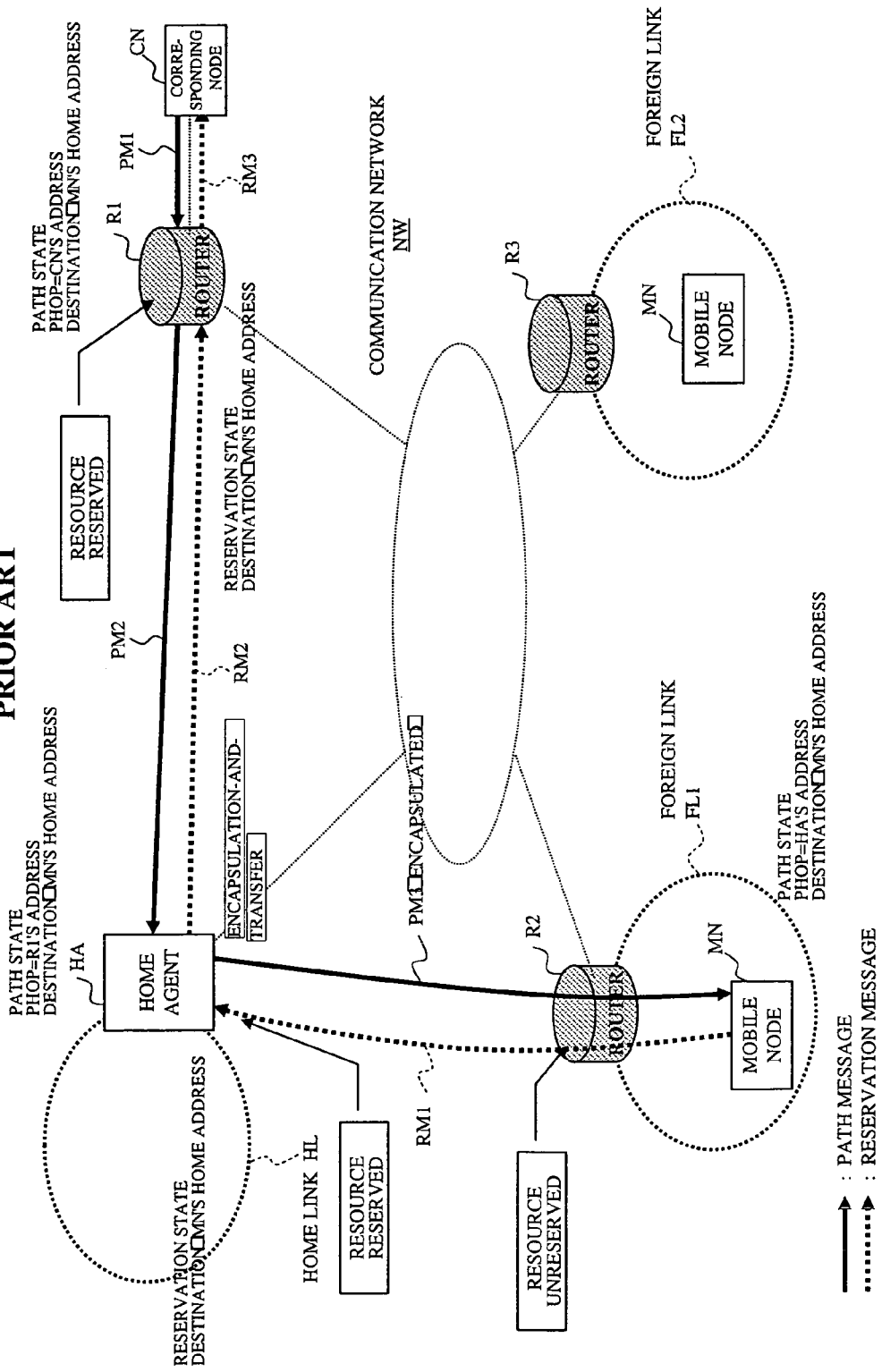
FIG. 31 is a network diagram showing an example (1) wherein a route without a resource reservation is generated by the prior art resource reservation method.

The arrangement of the communication network NW in FIG. 3 is the same as that shown in FIG. 31, except that the home agent HA shown in FIG. 3 has an arrangement shown in FIG. 1, and performs the processing shown in FIGS. 2A and 2B.

Also, the path messages PM1-PM3 and the reservation messages RM1-RM3 for making the resource reservation shown in FIG. 3 are the same as those in the conventional resource reservation procedure shown in FIG. 31.

However, in FIG. 3, path messages PM4, PM5, and reservation messages RM4, RM5 are inserted between the home agent HA and the second host MN.

FIG. 4A shows a message sequence of the path messages PM1-PM5 and the reservation messages RM1-R5 shown in FIG. 3. FIG. 4B shows how the path state, the reservation state, and the binding cache are generated in the home agent HA among the states shown by reference characters ST11-ST17 in FIG. 4A.

As shown in FIG. 4B, in the state of reference character ST11, the home agent HA holds the binding cache of the mobile node MN generated by the ordinary operation of the mobile IP.

In the states of reference characters ST12 and ST13 shown in FIG. 4B, the home agent HA generates the path state and the reservation state respectively, which are generated by the ordinary RSVP processing.

Thus, the home agent HA receives the reservation message RM1, performs the ordinary RSVP processing, and then retrieves the destination address (home address of mobile node MN) of the generated reservation state from the binding cache (at step S201 in FIG. 2B).

In this case, the home address of the mobile node MN exists in the binding cache (at step S202 in FIG. 2B), so that the home agent HA retrieves the path state in which the destination address is the home address of the mobile node MN (at step S203 in FIG. 2B).

In this case, the path state in which the destination address is the home address of the mobile node MN exists (at step S204 in FIG. 2B). The home agent HA then retrieves the reservation state in which the destination address is the care-of address of the mobile node MN obtained from the binding cache (at step S205 in FIG. 2B).

At this moment, the reservation state in which the destination address is the care-of address of the mobile node MN does not exist yet (at step S206 in FIG. 2B). Therefore, the home agent HA generates a path state in which the destination address is the care-of address of the mobile node MN, and the PHOP is the address of the node itself (address of home agent HA) (at step S207 in FIG. 2B, see the lower row of reference character ST14 in FIG. 4B). The information of the resource reservation in this case is copied from the path state in which the destination address is the home address of the mobile node MN (see the upper row of reference character ST14 in FIG. 4B).

The home agent HA transmits the path message PM4 in a non-capsulated state to the care-of address of the mobile node MN with the information of the newly generated path state (at steps S208 and S209 in FIG. 2B).

The path message PM4 destined for the care-of address of the mobile node MN is analyzed in the router R2 on the way, whereby a path state is generated in the router R2 as shown by reference character ST15 in FIG. 4A. The router R2 changes the PHOP of the path message PM4 addressed to the node itself (address of router R2), and transmits a path message PM5 to the mobile node MN located under the router R2.

The mobile node MN having received the path message PM5 transmits the reservation message RM4 to the PHOP (address of router R2) within the path message. The router R2 having received the reservation message RM4 generates a reservation state, or makes a resource reservation, as shown by reference character ST16 in FIG. 4A, and transfers a reservation message RM5 to the PHOP (address of home agent HA) in the path state held by the node itself.

The home agent HA having received the reservation message RM5 generates a reservation state, or makes a resource reservation in which the destination address is the care-of address (CoA under router R2) of the mobile node MN as shown in the lower row of reference character ST17 in FIG. 4B. The home agent HA retrieves an entry wherein the destination address is the care-of address under the router R2 from the path state held by the node itself. Since the PHOP is the same as the node itself, the home agent HA does not transfer the reservation message.

By the above-mentioned operation, the resource reservation in the router R2 is made possible.

Figure 5:
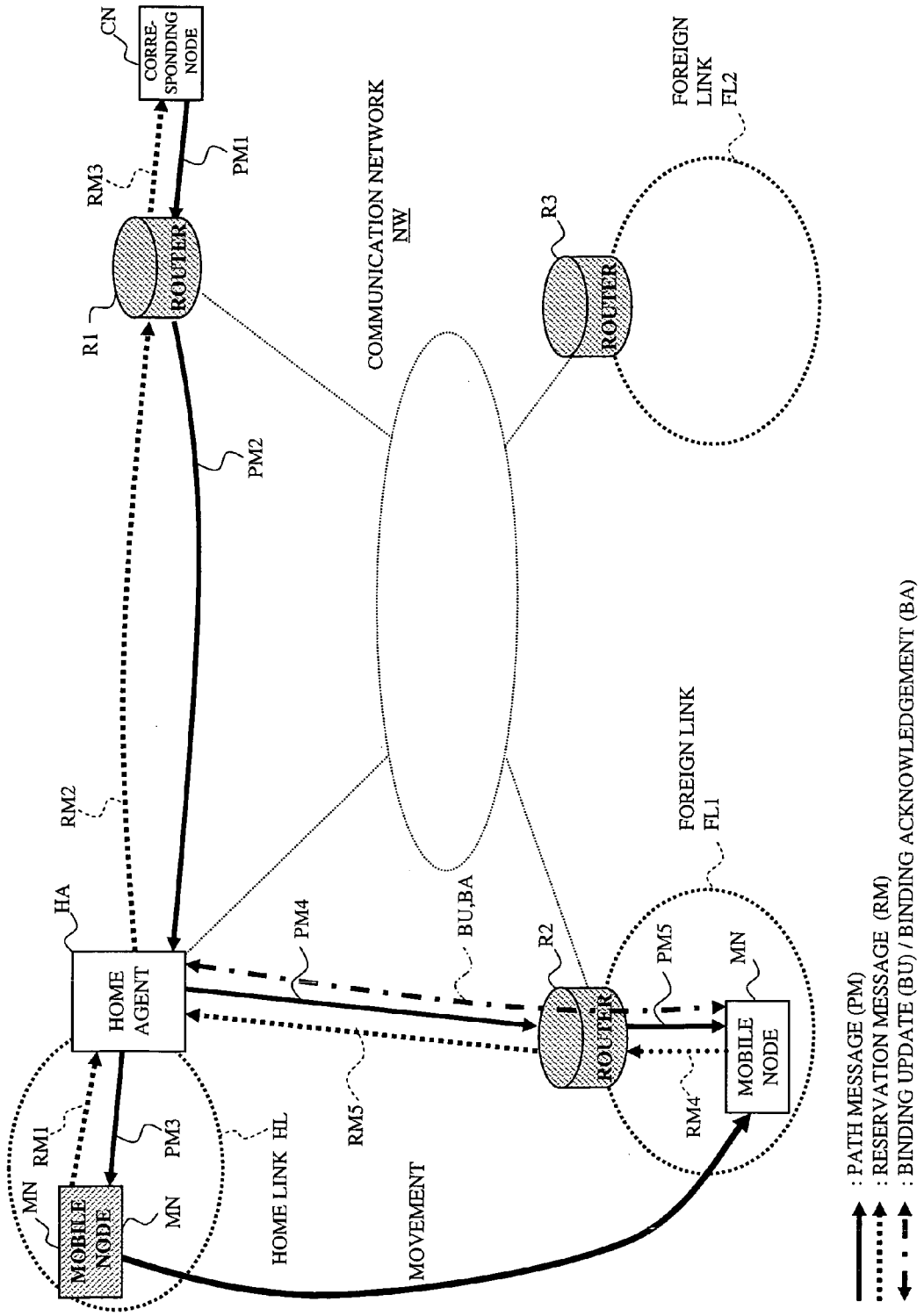
FIG. 5 is a network diagram showing a resource reservation (No.2) of an embodiment (1) according to the present invention.
Figure 6A:
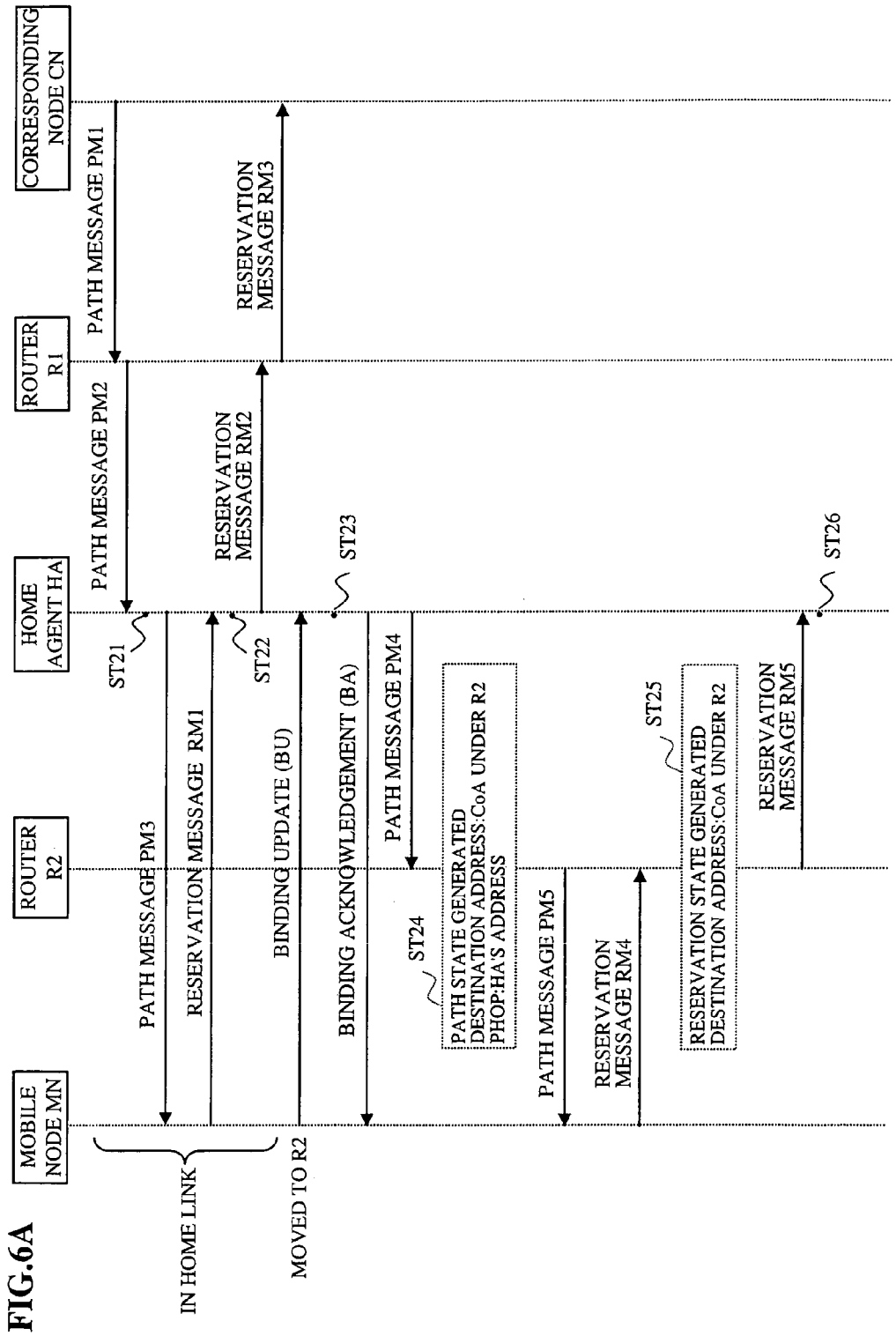
FIG. 6A is a diagram showing a message sequence of FIG. 5.

Resource Reservation (No.2) in embodiment (1): FIGS. 5, 6A, and 6B

FIGS. 5, 6A, and 6B show a resource reservation procedure in case the mobile node MN having completed the resource reservation while being located in the home link HL moves to the foreign link FL1 for the resource reservation (No.2) in the embodiment (1) of the present invention.

Figure 33:
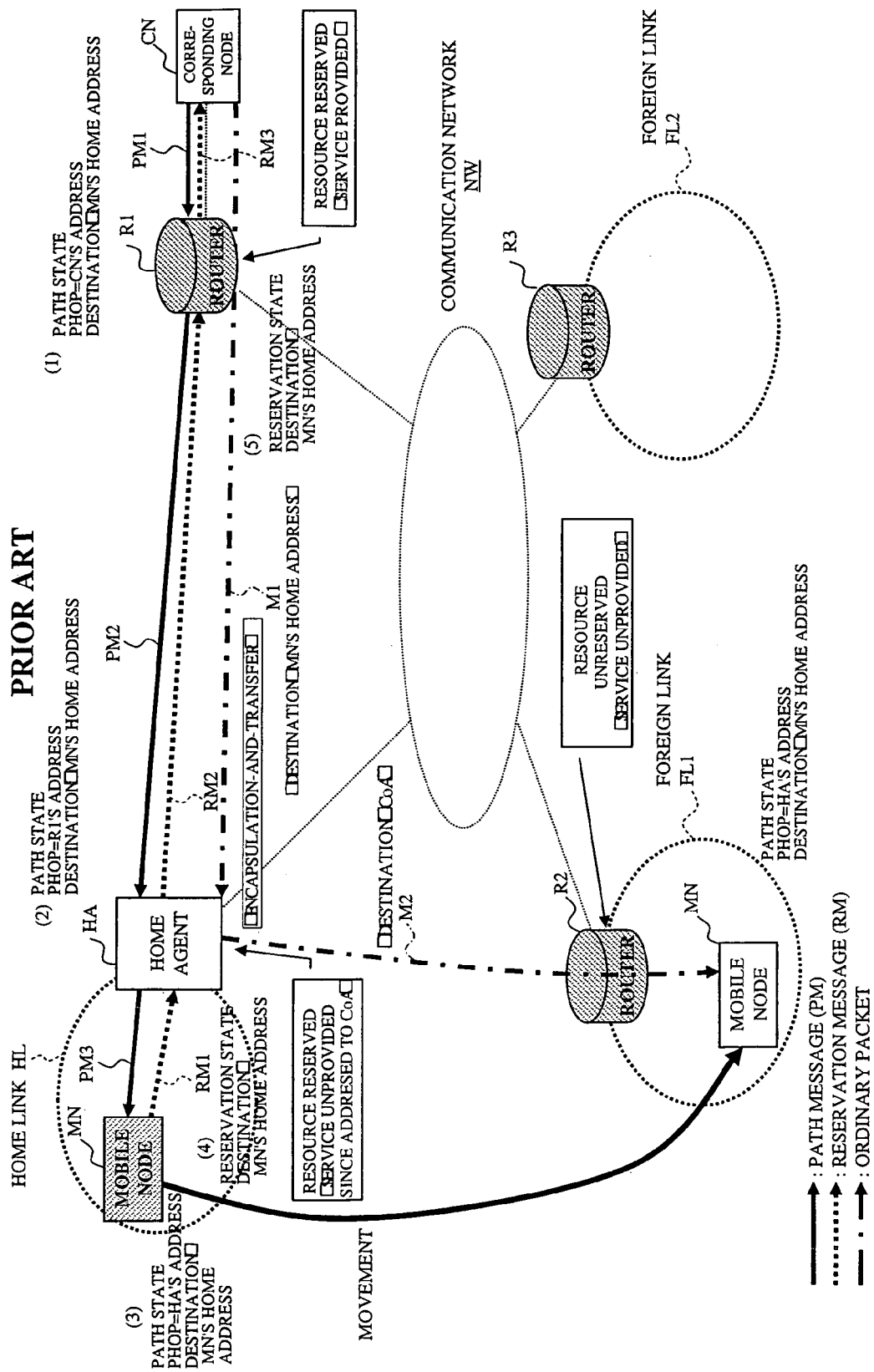
FIG. 33 is a network diagram showing an example (3) wherein a route without a resource reservation is generated by the prior art resource reservation method.

The arrangement of the communication network NW in FIG. 5 is the same as that shown in FIG. 33, except that the home agent HA shown in FIG. 5 has the arrangement shown in FIG. 1 and performs the processing shown in FIGS. 2A and 2B.

Also, the path messages PM1-PM3 and the reservation messages RM1-RM3 for the resource reservation shown in FIG. 5 are the same as those in the conventional resource reservation procedure shown in FIG. 33.

However, in FIG. 5, path messages PM4, PM5, reservation message RM4, RM5, a binding update BU, and a binding acknowledgement BA are inserted between the home agent HA and the second host MN.

FIG. 6A shows a message sequence of the path messages PM1-PM5, and the reservation messages RM1-RM5 of FIG. 5. FIG. 6B shows how the path state, the reservation state, and the binding cache are generated in the home agent HA among the states shown by reference characters ST21-ST26 in FIG. 6A.

In the states of reference characters ST21 and ST22 shown in FIG. 6B, the home agent HA generates the path state and the reservation state respectively, which are generated by the ordinary RSVP processing.

Also, the home agent HA transmits, upon receipt of the binding update BU from the mobile node MN, a binding acknowledgement BA according to the ordinary mobile IP after generating the binding cache at reference character ST23.

Also, the home agent HA is triggered in operation by the reception of the binding update BU to retrieve the binding cache with the home address of the mobile node MN registered by the binding update BU in the binding cache (at step S201 in FIG. 2B).

In this case, the home address of the mobile node MN exists in the binding cache (at step S202 in FIG. 2B), so that the home agent HA retrieves the path state in which the destination address is the home address of the mobile node MN (at step S203 in FIG. 2B). This is also found to exist (at step S204 in FIG. 2B), so that the home agent HA then retrieves the reservation state in which the destination address is the care-of address of the mobile node MN (at step S205 in FIG. 2B).

At this moment, the reservation state in which the destination address is the care-of address of the mobile node MN does not exist yet (at S206 in FIG. 2B). Therefore, the home agent HA generates a path state in which the destination address is the care-of address of the mobile node MN, and the PHOP is the address of the node itself (address of home agent HA) (at step S207 in FIG. 2B, see the lower row of reference character ST23 in FIG. 6B). The information of the resource reservation in this case is copied from the path state in which the destination address is the home address of the mobile node MN (see the upper row of reference character ST23 in FIG. 6B).

The home agent HA transmits the path message PM4 in a non-capsulated state to the care-of address of the mobile node MN by the information of the newly generated path state (at steps S208 and S209 in FIG. 2B).

The path message PM4 destined for the care-of address of the mobile node MN is analyzed in the router R2 on the way, whereby the path state is generated by router R2 as shown by reference character ST24 in FIG. 6A. The router R2 changes the PHOP of the path message PM4 into the address of the node itself (address of router R2), and transmits a path message PM5 to the mobile node MN located under the router R2.

The mobile node MN having received the path message PM5 transmits the reservation message RM4 to the PHOP (address of router R2) within the path message. The router R2 having received the reservation message RM4 generates a reservation state, or makes a resource reservation, as shown by reference character ST25 in FIG. 6A, and transfers the reservation message RM5 destined for the PHOP (address of home agent HA) in the path state held by the node itself.

The home agent HA having received the reservation message RM5 generates a reservation state, or makes a resource reservation in which the destination address is the care-of address (CoA under router R2) of the mobile node MN as shown in the lower row of reference character ST26 in FIG. 6B. The home agent HA retrieves an entry wherein the destination address is the care-of address under the router R2 from the path state held by the node itself. Since the PHOP is the same as the node itself, the home agent HA does not transfer the reservation message.

By the above-mentioned operation, the resource reservation in the router R2 is made possible.

Figure 7:
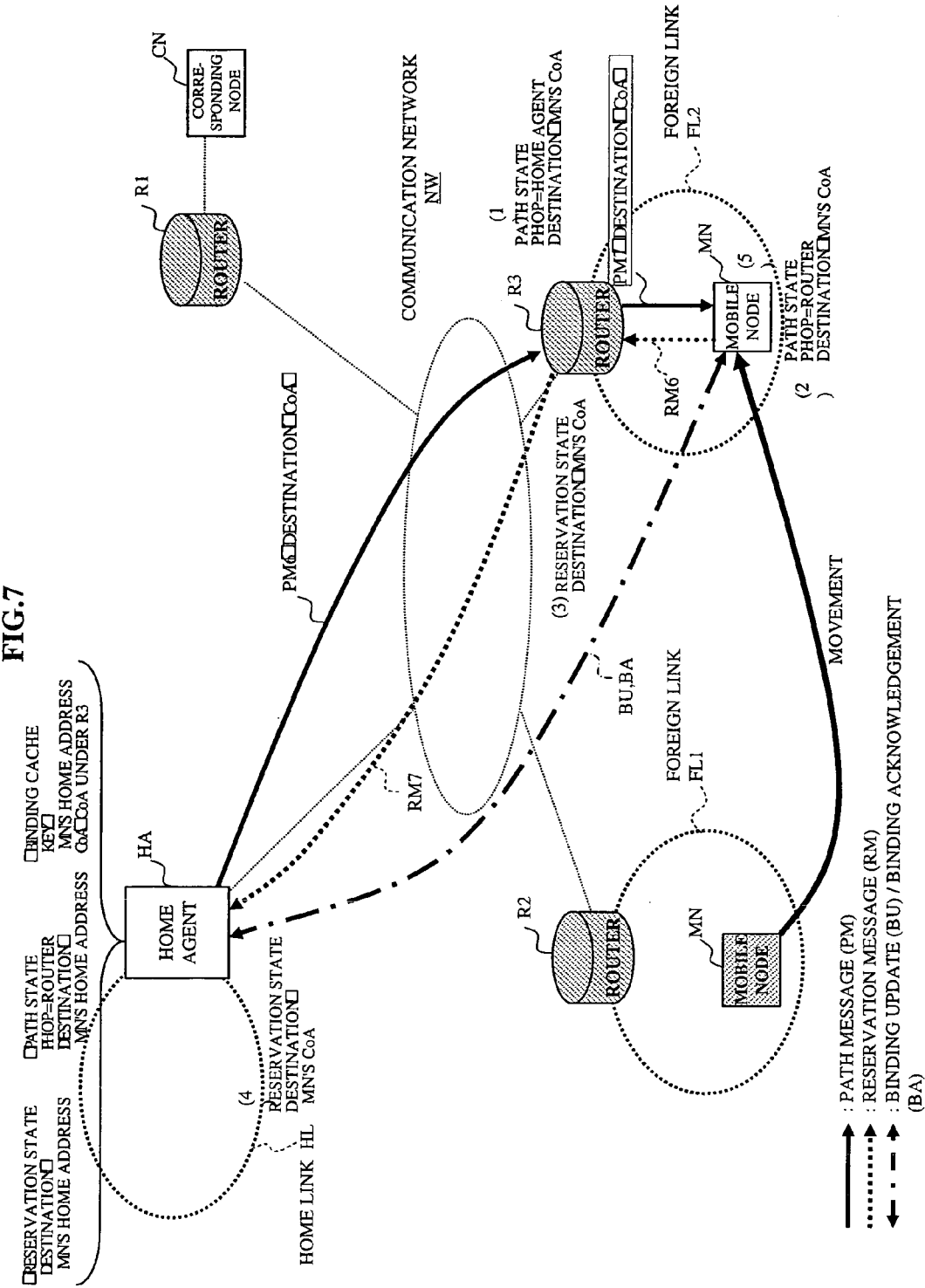
FIG. 7 is a network diagram showing a resource reservation (No.3) of an embodiment (1) according to the present invention.

Resource Reservation (No.3) in Embodiment (1): FIG. 7

FIG. 7 shows a resource reservation procedure in case the mobile node MN having completed the resource reservation while being located in the foreign link FL1 further moves to the foreign link FL2 as the resource reservation (No.3) in the embodiment (1) of the present invention.

The arrangement of the communication network NW in FIG. 7 is the same as those shown in FIGS. 3 and 5, except that the path messages PM1-PM5 and the reservation messages RM1-RM5 shown in FIGS. 3 and 5 are omitted in FIG. 7 since the resource reservation while the mobile node MN is located in the foreign link FL1 has been completed.

In FIG. 7, upon moving to the foreign link FL2, the mobile node MN transmits the binding update BU to the home agent HA. The home agent HA having received the binding update BU from the mobile node MN updates the binding cache according to the ordinary mobile IP, and transmits the binding acknowledgement BA. In this case, the care-of address associated with the home address of the mobile node MN in the binding cache is changed into the care-of address under the router R3 from the care-of address under the router R2.

Also, the home agent HA is triggered in operation by the reception of the binding update BU to retrieve the binding cache with the home address of the mobile node MN registered by the binding update BU in the binding cache (at step S201 in FIG. 2B).

In this case, the home address of the mobile node MN exists in the binding cache (at step S202 in FIG. 2B), so that the home agent HA retrieves the path state in which the destination address is the home address of the mobile node MN (at step S203 in FIG. 2B). This is also found to exist (at step S204 in FIG. 2B), so that the home agent HA then retrieves the reservation state in which the destination address is the care-of address of the mobile node MN (at step S205 in FIG. 2B).

At this moment, the reservation state in which the destination address is the care-of address of the mobile node MN under the router R3 does not exist yet (at S206 in FIG. 2B). Therefore, the home agent HA generates a path state in which the destination address is the care-of address of the mobile node MN (CoA under router R3), and the PHOP is the address of the node itself (address of home agent HA) (at step S207 in FIG. 2B). The information of the resource reservation in this case is copied from the path state in which the destination address is the home address of the mobile node MN.

The home agent HA transmits a path message PM6 in a non-capsulated state to the care-of address of the mobile node MN by the information of the newly generated path state (at steps S208 and S209 in FIG. 2B).

The path message PM6 destined for the care-of address of the mobile node MN is analyzed in the router R3 on the way, and a path state is generated. The router R3 changes the PHOP of the path message PM6 into the address of the node itself (address of router R3), and transmits a path message PM7 to the mobile node MN located under the router R3.

The mobile node MN having received the path message PM7 transmits a reservation message RM6 to the PHOP (address of router R3) within the path message. The router R3 having received the reservation message RM6 generates a reservation state, or makes a resource reservation, and transfers a reservation message RM7 to the PHOP (address of home agent HA) in the path state held by the node itself.

The home agent HA having received the reservation message RM7 generates a reservation state, or makes a resource reservation in which the destination address is the care-of address of the mobile node MN. The home agent HA retrieves an entry wherein the destination address is the care-of address under the router R3 from the path state held by the node itself. Since the PHOP is the same as the node itself, the home agent HA does not transfer the reservation message.

By the above-mentioned operation, the resource reservation in the router R3 is made possible.

Embodiment 2

In this embodiment (2), an application example to the hierarchical mobile IP will be described. When the present invention is applied to the hierarchical mobile IP, the arrangement and the processing flow of the home agent HA are the same as those shown in FIGS. 1, 2A, and 2B, except that the home address of the mobile node MN and the virtual care of address (VCoA) under the mobility agent MA are associated with each other in the binding cache table 21 of the home agent HA in the embodiment (2).

Also, as for the mobility agent MA, the arrangement may be the same as that shown in FIG. 1, while the VCoA in addition to the care-of address (PCoA) is associated with the home address of the mobile node MN in the binding cache 21 of the mobility agent MA.

Figure 8A:
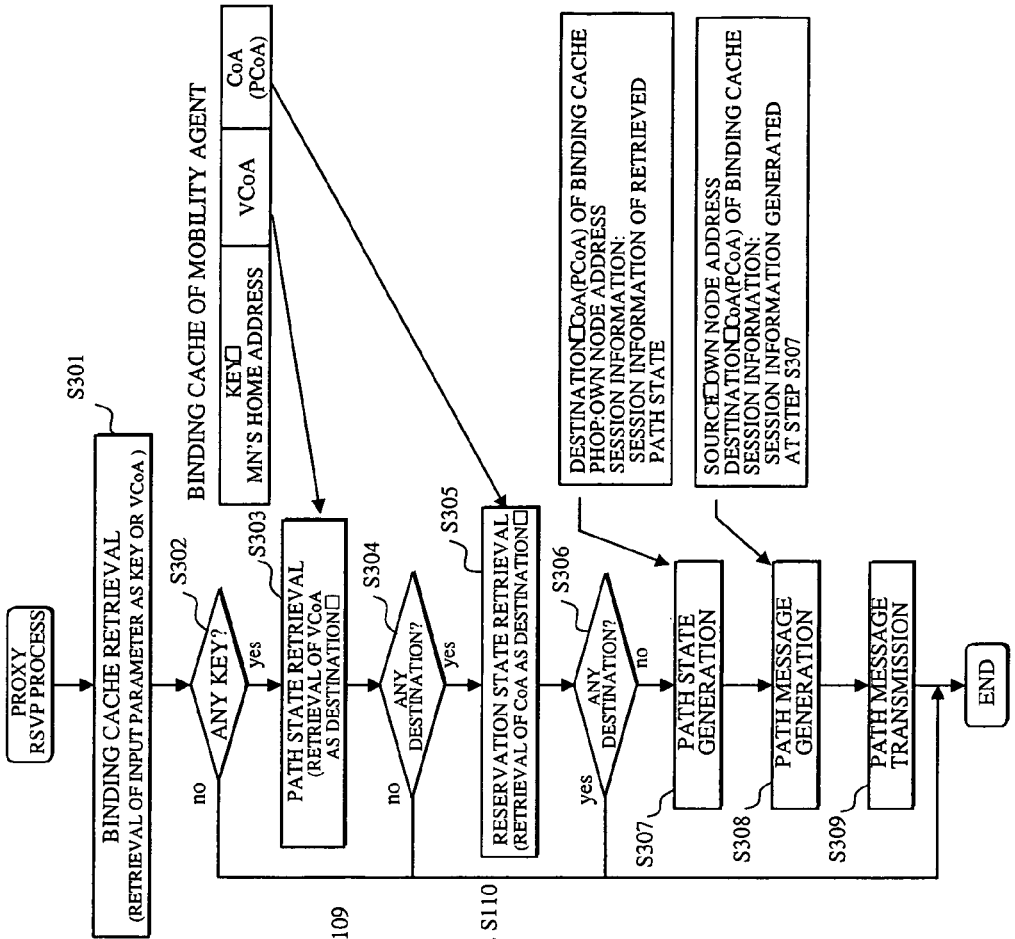
FIGS. 8A and 8B are flow charts showing a processing flow of a mobility agent MA in an embodiment (2) according to the present invention.
Figure 8B:
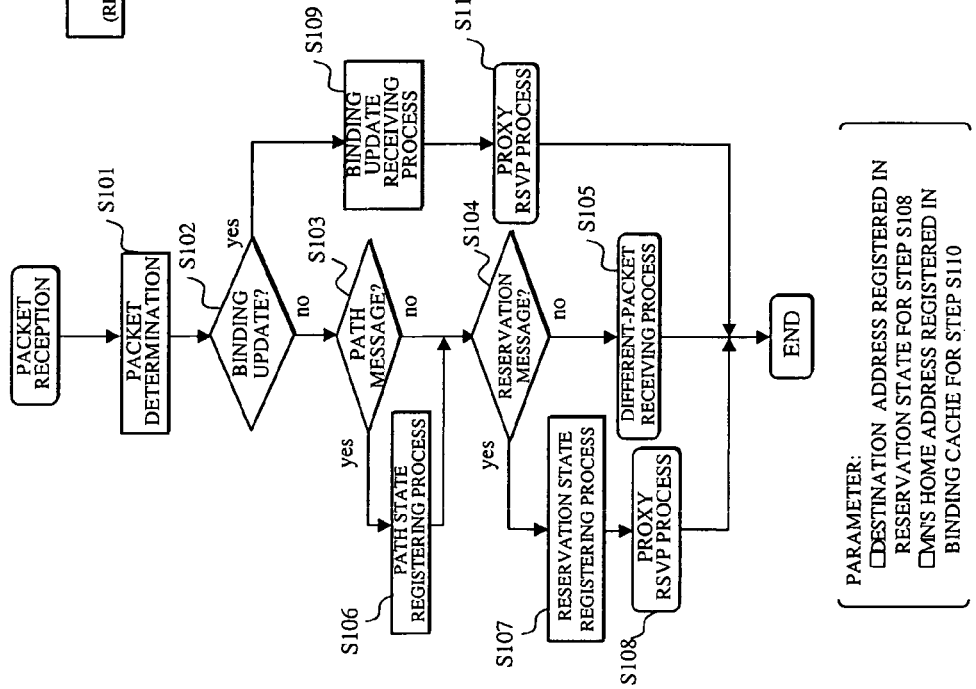

Meanwhile, the processing flow of the mobility agent MA shown in FIGS. 8A and 8B is different from that of the home agent HA shown in FIGS. 2A and 2B as described hereinafter.

FIG. 8A shows an overall processing flow which is the same as that shown in FIG. 2A, while the proxy RSVP processing flow shown in FIG. 8B is different from that shown in FIG. 2B.

Steps S301-S309 in FIG. 8B correspond to steps S201-S209 in FIG. 2B. However, step S301 is different from step S201 in that a key of the binding cache is retrieved if the input parameter is the home address of the mobile node (at step S110 in FIG. 8A), and the VCoA of the binding cache is retrieved if the input parameter is the destination address registered in the reservation state (at step S108 in FIG. 8A).

Also, step S303 is different from step S203 in that, when searching the path state, the VCoA is retrieved as the destination address.

Moreover, in this embodiment (2), since two types of resource reservation (Nos.1 and 2) can be made corresponding to the moving state of the mobile node MN, each type will be described.

Resource Reservation (No.1) in Embodiment (2): FIGS. 9, 10, 11A, and 11B

FIGS. 9, 10, 11A, and 11B show a resource reservation procedure when the mobile node MN is located in the foreign link FL1 in the hierarchical mobile IP for the resource reservation (No.1) in the embodiment (2) of the present invention.

Figure 9:
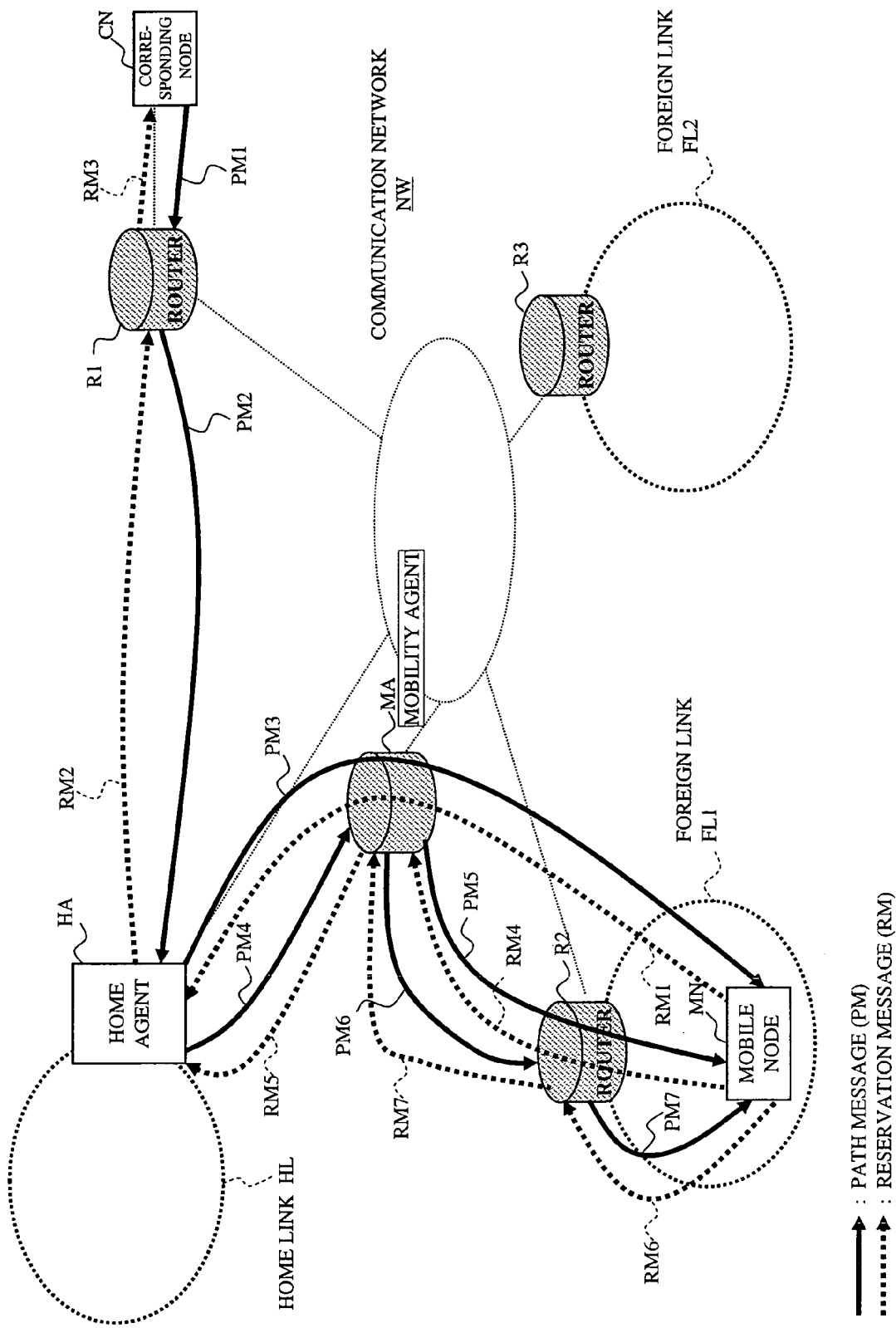
FIG. 9 is a network diagram showing a resource reservation (No.1) of an embodiment (2) according to the present invention.
Figure 26:
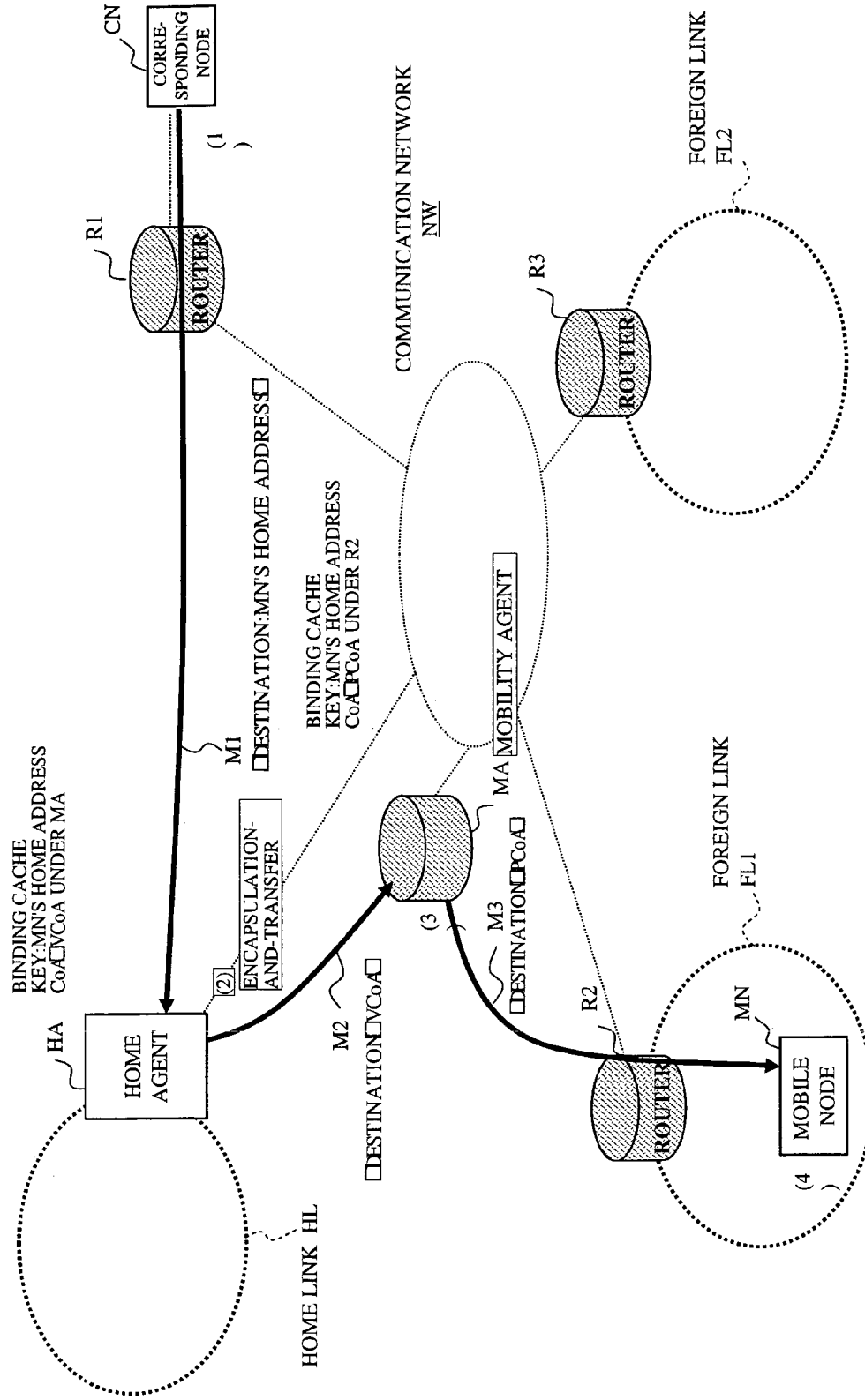
FIG. 26 is a network diagram showing an encapsulation-and-transfer example in a hierarchical mobile IP.

The arrangement of the communication network NW in FIG. 9 is the same as that shown in FIG. 26. In the embodiment (2) shown in FIG. 9, path messages PM4, PM5, reservation messages RM4, and RM5 by the proxy RSVP processing of the home agent HA, and path messages PM6, PM7, reservation messages RM6, and RM7 by the proxy RSVP processing of the mobility agent MA are added to the path messages PM1-PM3 and the reservation messages RM1-RM3 in the ordinary RSVP processing.

Figure 10:
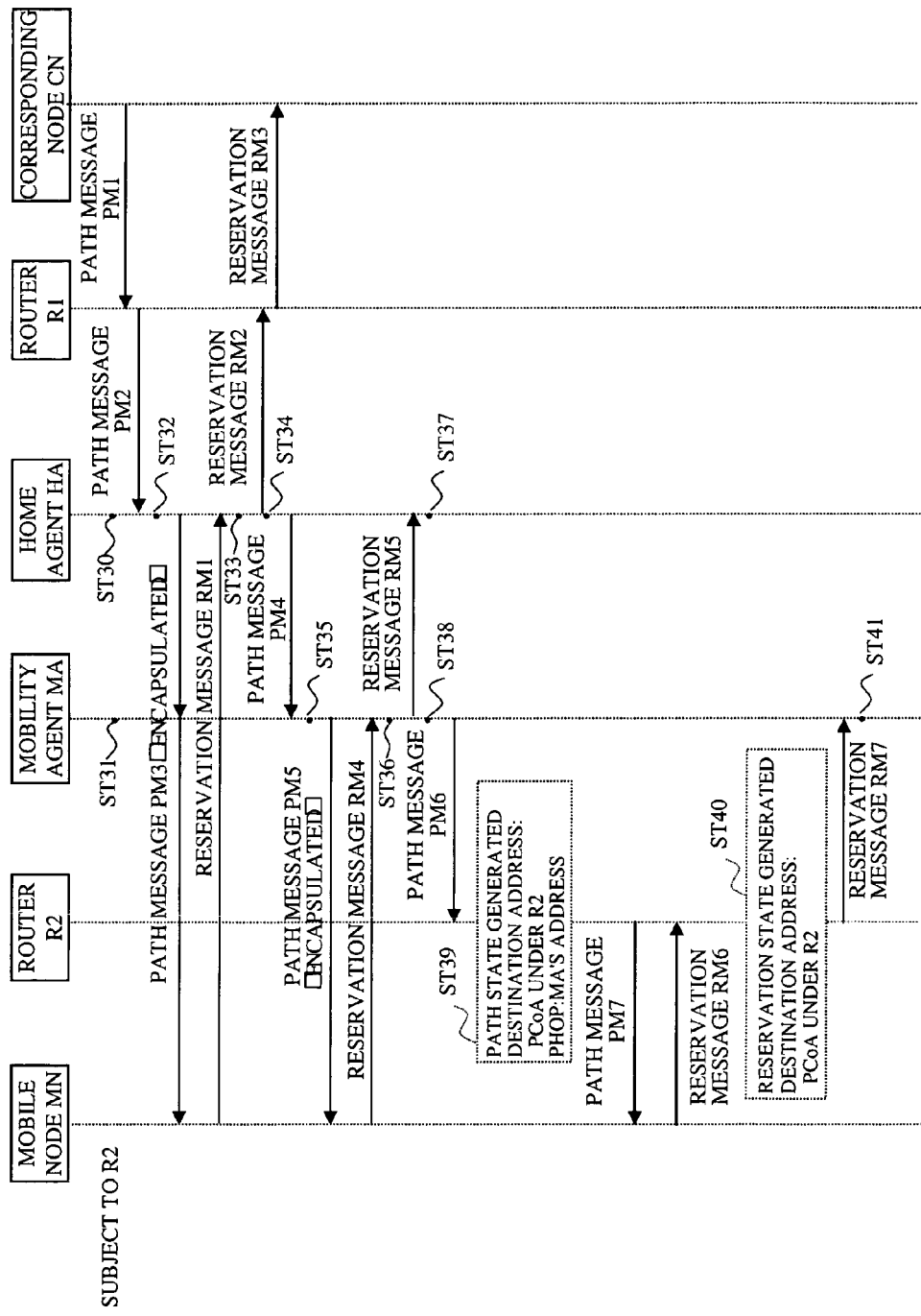
FIG. 10 is a diagram showing a message sequence of FIG. 9.

FIG. 10 shows the message sequence of the path messages PM1-PM7 and the reservation messages RM1-R7 shown in FIG. 9. FIGS. 11A and 11B show how the path state, the reservation state, and the binding cache are generated in the home agent HA and the mobility agent MA among the states shown by reference characters ST30-ST41 in FIG. 10.

Therefore, the path messages PM1-PM5 and the reservation messages RM1-RM5 shown in FIGS. 9 and 10 are the same as those shown in FIGS. 3 and 4A. Also, the state of the home agent HA shown in FIG. 11A is the same as that shown in FIG. 4B, except that the care-of address of the mobile node MN has been changed from the CoA under the router R2 to the VCoA under the mobility agent MA.

It is to be noted that the path message PM3 in FIG. 10 in contrast to FIG. 4A is encapsulated from the home agent HA to the mobility agent MA with the VCoA under the mobility agent MA treated as the destination, and from the mobility agent MA to the mobile node MN with the physical care of address (PCoA) under the router R2 treated as the destination.

Also, the path message PM5 transmitted to the mobile node MN from the mobility agent MA in FIG. 10 in contrast to FIG. 4A is re-encapsulated with the physical care-of address (PCoA) under the router R2 treated as the destination.

Hereinafter, the proxy RSVP processing by the home agent HA and the mobility agent MA in this embodiment (2) will be described referring to FIGS. 10, 11A, and 11B.

Firstly, in the states of reference characters ST30 and ST31, the home agent HA and the mobility agent MA respectively hold the binding cache of the mobile node MN, which is generated by the operation of the ordinary hierarchical mobile IP. Also, the path/reservation states generated by the home agent HA in reference characters ST32 and ST33 are generated by the ordinary RSVP processing.

The home agent HA receives the reservation message RM1, performs the ordinary RSVP processing, and then retrieves the binding cache with the destination address (home address of mobile node MN) of the generated reservation state (at step S201 in FIG. 2B).

In this case, since the home address of the mobile node MN exists in the binding cache, the home agent HA retrieves the path state in which the destination address is the home address of the mobile node MN (at steps S202 and S203 in FIG. 2B).

As a result, the path state in which the destination address is the home address of the mobile node MN exists, so that the home agent HA then retrieves the reservation state in which the destination address is the care-of address of the mobile node MN obtained from the binding cache (at steps S204 and S205 in FIG. 2B).

At this moment, the reservation state in which the destination address is the care-of address of the mobile node MN does not exist yet (at step S206 in FIG. 2B). Therefore, the home agent HA generates a path state in which the destination address is the care-of address of the mobile node MN (VCoA under mobility agent MA), and the PHOP is the address of the node itself (address of home agent HA) (at step S207 in FIG. 2B, see the lower row of reference character ST34 in FIG. 11A). The information of the resource reservation in this case is copied from the path state in which the destination address is the home address of the mobile node MN (see the upper row of reference character ST34 in FIG. 11A).

The home agent HA transmits the path message PM4 in a non-capsulated state to the care-of address of the mobile node MN (VCoA under MA) with the information of the newly generated path state (at steps S208 and S209 in FIG. 2B).

The path message PM4 destined for the care-of address of the mobile node MN (VCoA under MA) is analyzed in the mobility agent MA on the way, whereby a path state shown by reference character ST35 in FIG. 11B is generated in the mobility agent MA. The mobility agent MA re-encapsulates the path message PM4 destined for the care-of address (VCoA) of the mobile node MN, to be transmitted as a path message PM5 destined for the PCoA of the mobile node MN. In this case, the router R2 on the way can not generate a path state since the path message PM5 is encapsulated.

The mobile node MN having received the path message destined for the PCoA of the mobile node MN transmits the reservation message RM4 to the PHOP (address of mobility agent MA) within the path message. The mobility agent MA having received the reservation message RM4 generates a reservation state, or makes a resource reservation, as shown by reference character ST36 in FIG. 11B, and transfers a reservation message RM5 to the PHOP (address of home agent HA) in the path state held by the node itself The home agent HA having received the reservation message RM5 generates a reservation state, or makes a resource reservation, as shown in the lower row of reference character ST37 in FIG. 11B. The home agent HA retrieves an entry wherein the destination address is the VCoA from the path state held by the node itself Since the PHOP is the same as the node itself, the home agent HA does not transfer the reservation message.

At this point, the resource reservation for the router R2 is not finished yet, so that the mobility agent MA performs the proxy RSVP processing described hereinafter.

Thus, the mobility agent MA having received the reservation message RM4 performs the ordinary RSVP process, and then retrieves the binding cache with the destination address (VCoA of mobile node MN) of the generated reservation state (at step S301 in FIG. 8B).

In this case, the VCoA of the mobile node MN exists in the binding cache, so that the mobility agent MA retrieves the path state in which the destination address is the VCoA of the mobile node MN (at steps S302 and S303 in FIG. 8B).

As a result, the path state in which the destination address is the VCoA of the mobile node MN exists (at step S304 in FIG. 8B). The mobility agent MA then retrieves the reservation state in which the destination address is the care-of address of the mobile node MN, i.e. the PCoA obtained from the binding cache (at step S305 in FIG. 8B).

At this moment, the reservation state in which the destination address is the care-of address of the mobile node MN does not exist yet (at step S306 in FIG. 8B). Therefore, the mobility agent MA generates a path state in which the destination address is the care-of address of the mobile node MN (PCoA under router R2), and the PHOP is the address of the node itself (address of mobility agent MA) (at step S307 in FIG. 8B, see the lower row of reference character ST38 in FIG. 11B).

The information of the resource reservation in this case is copied from the path state in which the destination address is the VCoA of the mobile node MN (see the upper row of reference character ST38 in FIG. 11B), and the path message PM6 is transmitted in a non-capsulated state to the point of the care-of address of the mobile node MN (PCoA) with the information of the newly generated path state (at steps S308 and S309 in FIG. 8B).

The path message PM6 destined for the care-of address of the mobile node MN is analyzed in the router R2 on the way, whereby a path state is generated in the router R2 as shown by reference character ST39 in FIG. 10. The path message is transmitted as a path message PM7 and reaches the mobile node MN located under the router R2.

The mobile node MN having received the path message PM7 transmits the reservation message RM6 to the PHOP (router R2) within the path message PM7. The router R2 having received the reservation message generates a reservation state, or makes a resource reservation, as shown by reference character ST40 in FIG. 10, and transfers a reservation message RM7 to the PHOP (address of mobility agent MA) in the path state held by the node itself.

The mobility agent MA having received the reservation message RM7 generates a reservation state, or makes a resource reservation, as shown in the lower row of reference character ST41 in FIG. 11B. The mobility agent MA retrieves an entry wherein the destination address is the PCoA from the path state held by the node itself. Since the PHOP is the same as the node itself, the mobility agent MA does not transfer the reservation message.

By the above-mentioned operation, the resource reservation in the mobility agent MA and the router R2 is made possible.

Figure 13A:
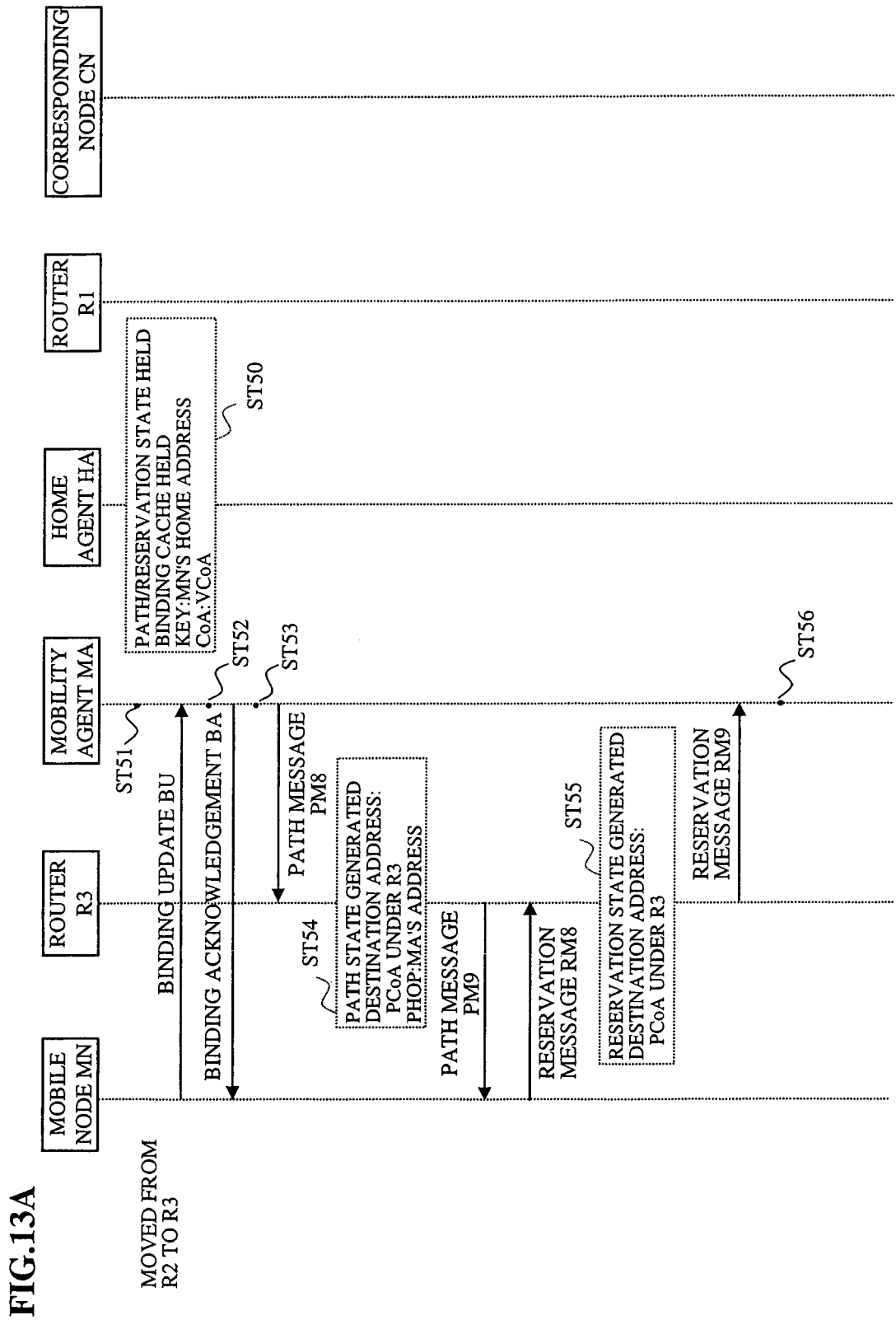
FIG. 13A is a diagram showing a message sequence of FIG. 12.

Resource Reservation (No.2) in Embodiment (2): FIGS. 12, 13A, and 13B

FIGS. 12, 13A, and 13B show a resource reservation procedure for the resource reservation (No.2) in the embodiment (2) of the present invention, in case the mobile node MN having completed the resource reservation between the corresponding node CN and the mobile node MN while being located in the foreign link FL1 managed by the mobility agent MA as described above in the resource reservation (No.1) in the embodiment (2), moves to the foreign link FL2.

As shown in FIGS. 12, 13A and 13B, the mobile node MN having moved from the foreign link FL1 to the foreign link FL2 transmits a binding update BU to the mobility agent MA, and in response thereto, the mobility agent MA transmits a binding acknowledgement BA to the mobile node MN.

It is to be noted that FIG. 13A shows a message sequence of the binding update BU, the binding acknowledgement BA, the path messages PM8, PM9, the reservation messages RM8, and RM9 of FIG. 12. FIG. 13B shows how the path state, the reservation state, and the binding cache are generated in the mobility agent MA among the states shown by reference characters ST50-ST56 in FIG. 13A.

As shown in FIGS. 13A and 13B, the home agent HA and the mobility agent MA hold the binding cache of the mobile node MN in the respective states of reference characters ST50 and ST51, which is generated by the ordinary operation of the hierarchical mobile IP. Also, the home agent HA holds the path state and the reservation state associated with the home address and the VCoA of the mobile node MN, and the mobility agent MA holds the path state and the reservation state associated with the VCoA and the PCoA of the mobile node MN.

The mobility agent MA having received the binding update BU from the mobile node MN updates the binding cache, and changes the care-of address from the PCoA under router R2 into PCoA under router R3 as shown by reference character ST52 in FIG. 13B.

The mobility agent MA is triggered in operation by the reception of the binding update BU to retrieve the binding cache with the home address of the mobile node MN registered by the binding update BU in the binding cache. Then the mobility agent MA retrieves the path state in which the destination address is the VCoA of the mobile node MN (at steps S301-S303 in FIG. 8B).

In this case, the path state in which the destination address is the VCoA of the mobile node MN exists (at step S304 in FIG. 8B). The mobility agent MA then retrieves the reservation state in which the destination address is the PCoA (under router R3) of the mobile node MN (at step S305 in FIG. 8B).

At this moment, the reservation state in which the destination address is the PCoA (under router R3) of the mobile node MN does not exist yet (at step S306 in FIG. 8B). Therefore, the mobility agent MA generates a path state in which the destination address is the care-of address of the mobile node MN (PCoA under router R3), and the PHOP is the address of the node itself (address of mobility agent MA) (at step S307 in FIG. 8B, see the lowermost row of reference character ST53 in FIG. 13B).

The information of the resource reservation in this case is copied from the path state in which the destination address is the VCoA of the mobile node MN (see the uppermost row of reference character ST53 in FIG. 13B), and a path message PM8 is transmitted in a non-capsulated state to the care-of address of the mobile node MN (PCoA) with the information of the newly generated path state (at steps S308 and S309 in FIG. 8B).

The path message PM8 destined for the care-of address (PCoA) of the mobile node MN is analyzed in the router R3 on the way, whereby a path state is generated as shown by reference character ST54 in FIG. 13A. The path message is transmitted as a path message PM9 and reaches the mobile node MN located under the router R3.

The mobile node MN having received the path message PM9 transmits a reservation message RM8 to the PHOP (router R3) within the path message PM9. The router R3 having received the reservation message RM8 generates a reservation state, or makes a resource reservation, as shown by reference character ST55 in FIG. 13A, and transfers a reservation message RM9 to the PHOP (address of mobility agent MA) in the path state held by the node itself.

The mobility agent MA having received the reservation message RM9 generates a reservation state, or makes a resource reservation, as shown in the lowermost row of reference character ST56 in FIG. 13B. The mobility agent MA retrieves an entry wherein the destination address is the PCoA from the path state held by the node itself. Since the PHOP is the same as the node itself, the mobility agent MA does not transfer the reservation message.

By the above-mentioned operation, the resource reservation in the mobility agent MA and the router R3 is made possible.

Embodiment 3

In this embodiment (3), an application example to the mobile IP using the edge node will be described. In case of the mobile IP using the edge node, the arrangement and the processing flow of the virtual home agent VHA and the edge node EN are the same as those shown in FIGS. 1, 2A, and 2B.

However, the edge node determines whether or not the packet received at step S102 of FIG. 2A is a cache notification instead of determining whether or not the packet is a binding update.

Moreover, also in this embodiment (2), since two types of resource reservation (Nos.1 and 2) can be made corresponding to the moved state of the mobile node MN, each type will be described.

Figure 14:
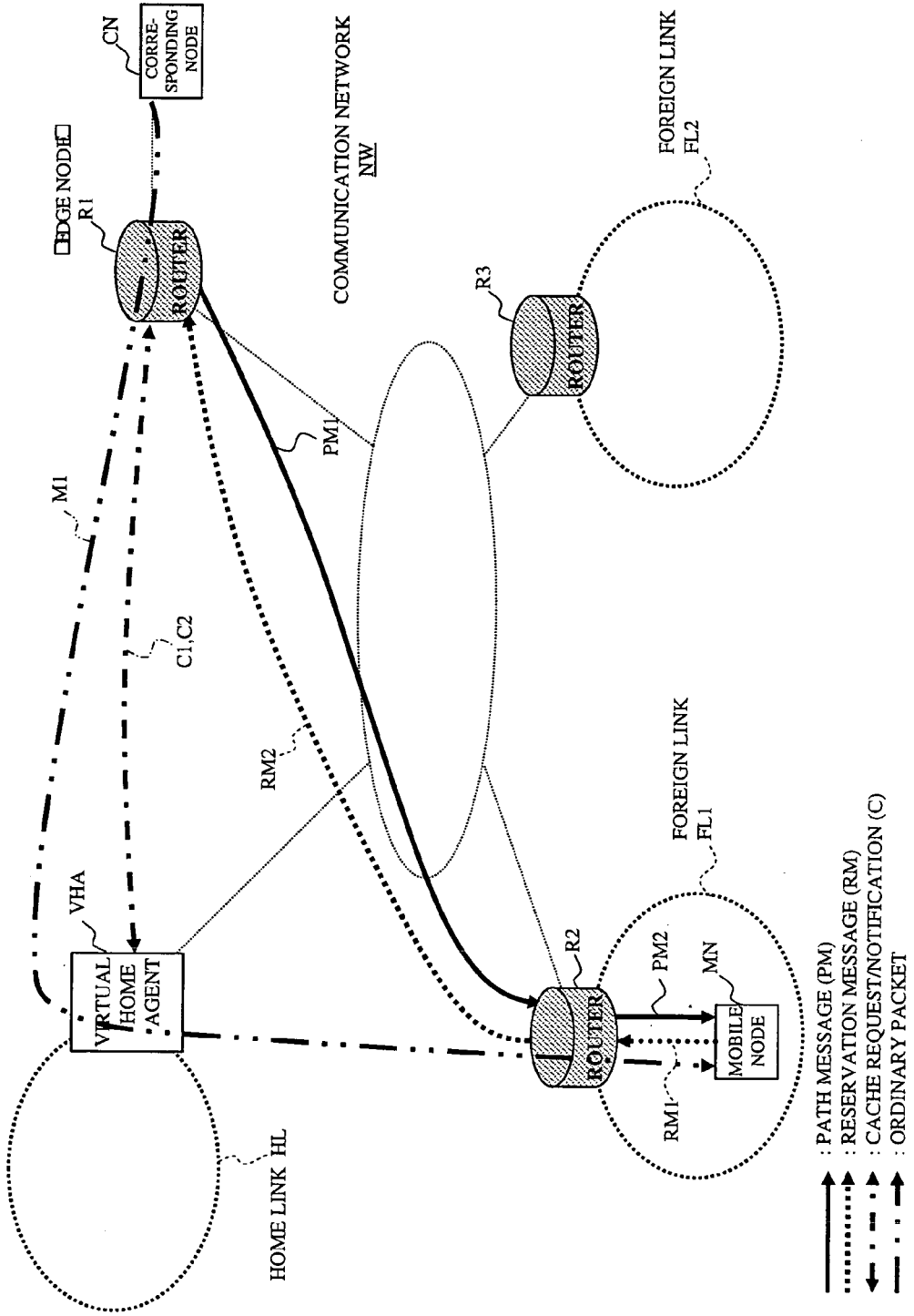
FIG. 14 is a network diagram showing a resource reservation (No.1) of an embodiment (3) according to the present invention.
Figure 15A:
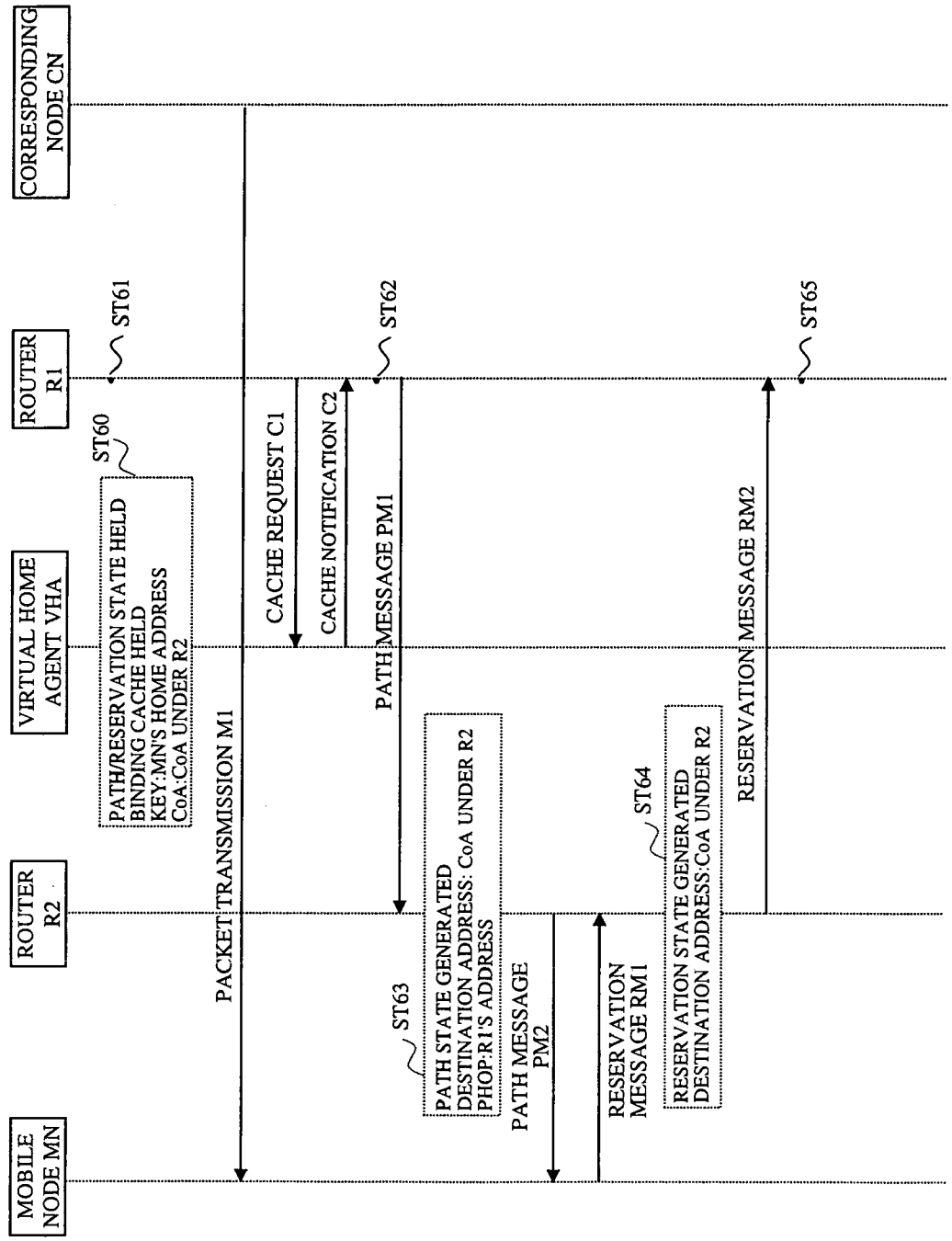
FIG. 15A is a diagram showing a message sequence of FIG. 14.

Resource Reservation (No.1) in Embodiment (3): FIGS. 14, 15A, and 15B

FIGS. 14, 15A, and 15B show the resource reservation procedure when the edge node is used for the resource reservation (No.1) in the embodiment (3) of the present invention.

Figure 27:
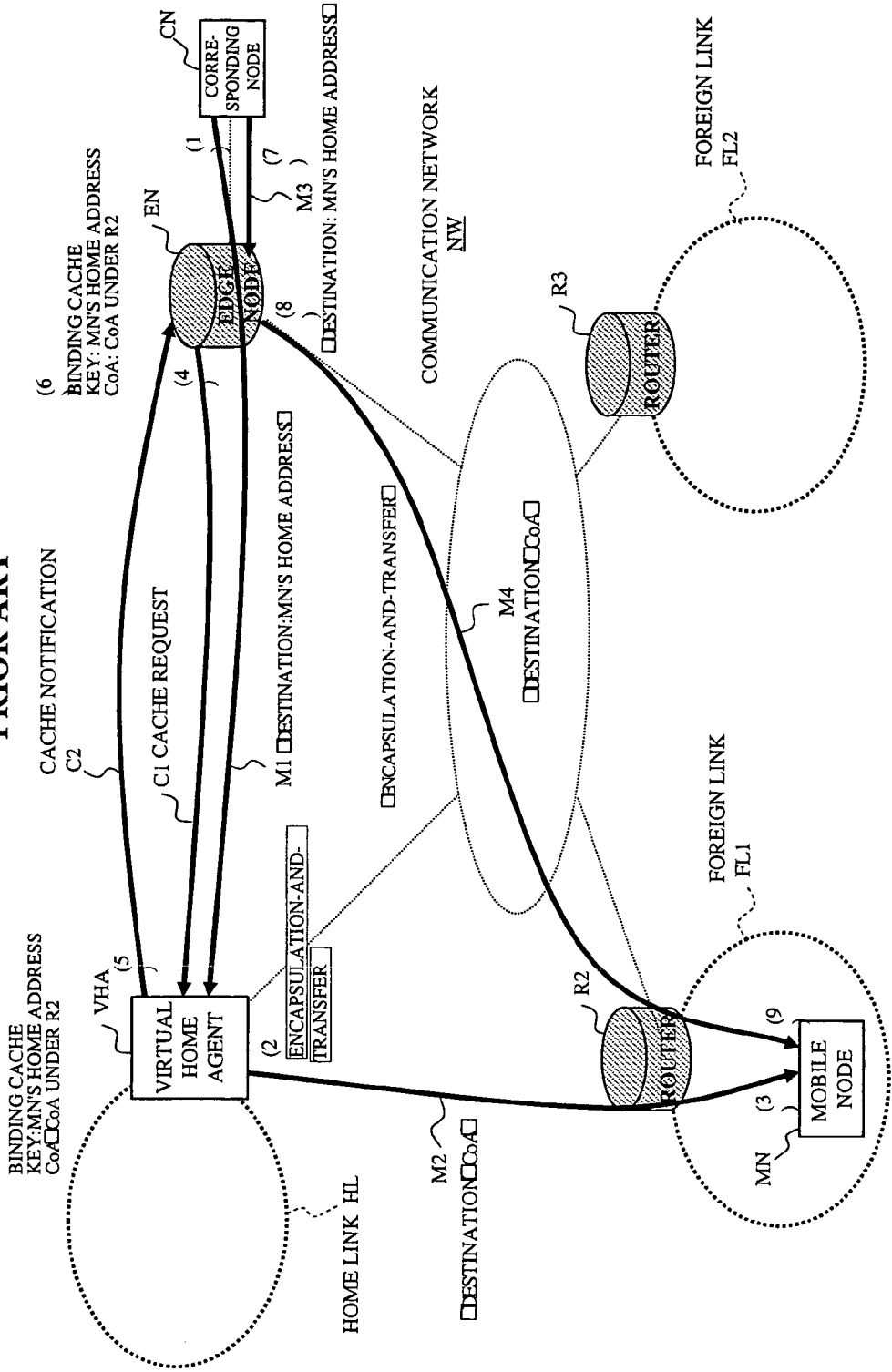
FIG. 27 is a network diagram showing an encapsulation-and-transfer example in a mobile IP using an edge node.

The arrangement of the communication network NW in FIG. 14 is the same as that shown in FIG. 27. FIG. 14 shows a cache request C1 transmitted to the virtual home agent VHA by the router R1 that is the edge node upon transferring an ordinary packet M1, a cache notification C2 transmitted in response thereto by the virtual home agent VHA to the router R1, the path messages PM1, PM2, and the reservation messages RM1, RM2. Also the message sequence thereof is shown in FIG. 15A, and the generation states of the path state, the reservation state, and the binding cache in the router R1, among the states shown by reference characters ST60-ST65 in FIG. 15A are shown in FIG. 15B.

As shown in FIGS. 15A and 15B, the virtual home agent VHA and the router R1 hold the binding cache of the mobile node MN in the respective states of reference character ST60 and ST61, which is generated by the ordinary operations of the mobile IP and the edge node. Also, the virtual home agent VHA and the router R1 hold resource reservation information (path state and reservation state) associated with the home address of the mobile node MN, which is generated by the ordinary operation of the RSVP.

The router R1 having received the cache notification C2 generates the binding cache for the mobile node MN as shown by reference character ST62 in FIG. 15B.

Also, the router R1 is triggered in operation by the reception of the cache notification C2 to retrieve the binding cache with the home address of the mobile node MN registered in the binding cache (at step S201 in FIG. 2B).

In this case, since the home address of the mobile node MN exists in the binding cache, the router R1 then retrieves the path state in which the destination address is the home address of the mobile node MN. Since the path state also exists, the router R1 then retrieves the reservation state in which the destination address is the care-of address of the mobile node MN (at steps S202-S205 in FIG. 2B).

At this moment, the reservation state in which the destination address is the care-of address of the mobile node MN does not exist yet (see S206 in FIG. 2B). Therefore, the router R1 generates a path state in which the destination address is the care-of address of the mobile node MN, and the PHOP is the address of the node itself (address of router R1) (at step S207 in FIG. 2B, see the lower row of reference character ST62 in FIG. 15B). The information of the resource reservation in this case is copied from the path state in which the destination address is the home address of the mobile node MN (see the upper row of reference character ST62 in FIG. 15B).

The router R1 transmits the path message PM1 in a non-capsulated state to the point of the care-of address of the mobile node MN by the information of the newly generated path state (at steps S208 and S209 in FIG. 2B).

The path message PM1 destined for the care-of address of the mobile node MN is analyzed in the router R2 on the way, whereby the path state is generated by the router R2 as shown by reference character ST63 in FIG. 15A. The router R2 changes the PHOP of the path message PM1 into the address of the node itself (address of router R2), and transmits a path message PM2 to the mobile node MN located under the router R2.

The mobile node MN having received the path message PM2 transmits the reservation message RM1 to the PHOP (address of router R2) within the path message PM2. The router R2 having received the reservation message RM1 generates a reservation state, or makes a resource reservation, as shown by reference character ST64 in FIG. 15A, and transfers a reservation message RM2 to the PHOP (address of router R1) in the path state held by the node itself.

The router R1 having received the reservation message RM2 generates a reservation state, or makes a resource reservation in which the destination address is the care-of address (CoA under router R2) of the mobile node MN as shown in the lower row of reference character ST65 in FIG. 15B. The router R1 retrieves an entry wherein the destination address is the care-of address under the router R2 from the path state held by the node itself. Since the PHOP is the same as the node itself, the home agent HA does not transfer the reservation message.

By the above-mentioned operation, the resource reservation in the router R2 is made possible.

Figure 17A:
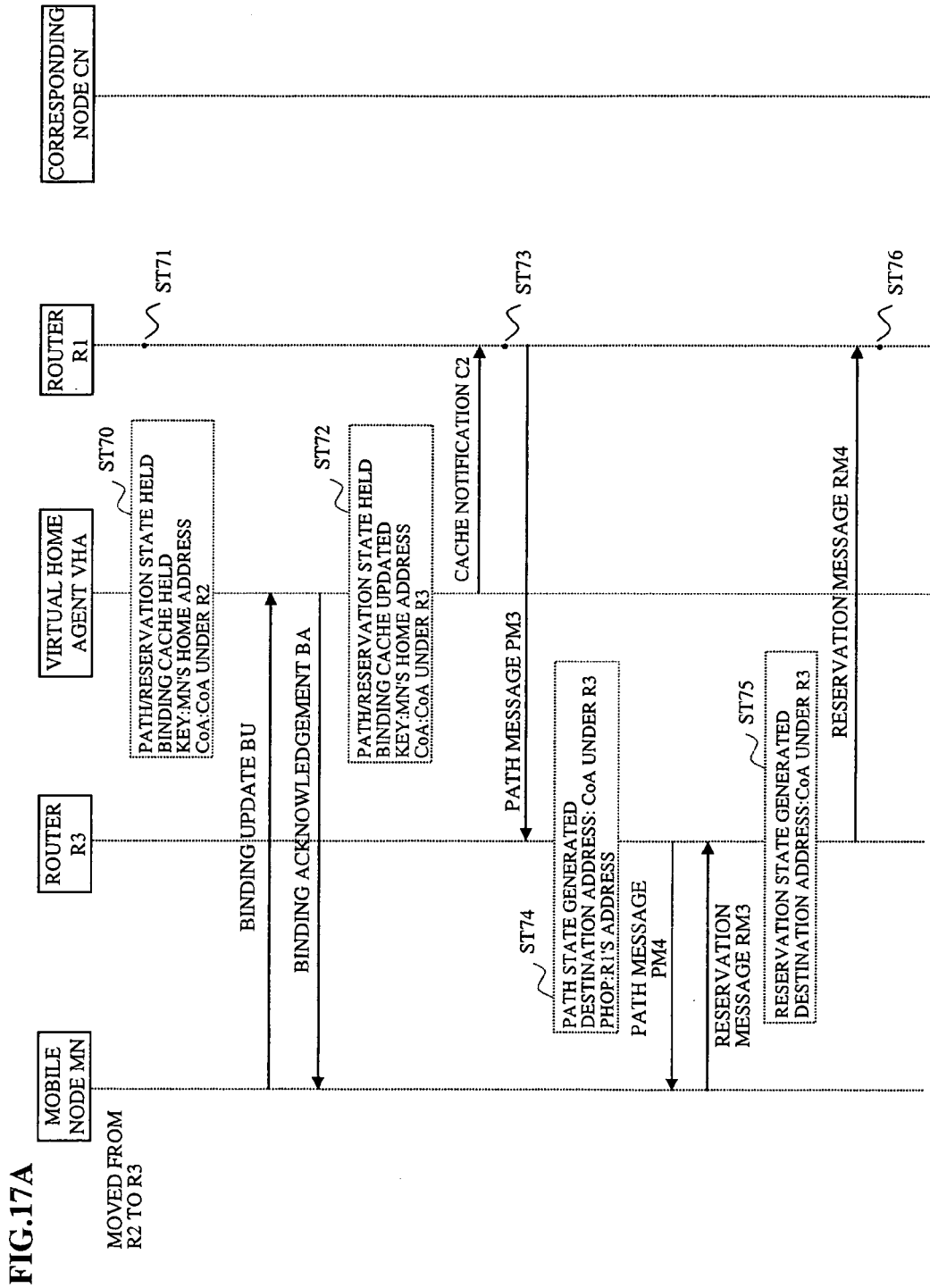
FIG. 17A is a diagram showing a message sequence of FIG. 16.

Resource Reservation (No.2) in Embodiment (3): FIGS. 16, 17A, and 17B

FIGS. 16, 17A, and 17B show a resource reservation procedure for the resource reservation (No.2) in the embodiment (3) of the present invention, in case the mobile node MN having completed the resource reservation between the corresponding node CN and the mobile node MN while being located in the foreign link FL1 as described above in the resource reservation (No.1) in the embodiment (3) moves to the foreign link FL2.

As shown in FIGS. 16, 17A and 17B, the mobile node MN having moved from the foreign link FL1 to the foreign link FL2 transmits a binding update BU to the virtual home agent VHA, and in response thereto, the virtual home agent VHA transmits a binding acknowledgement BA to the mobile node MN. The virtual home agent VHA also transmits the cache notification C2 to the router R1.

It is to be noted that FIG. 17A shows the message sequence of the binding update BU, the binding acknowledgement BA, the cache notification C2, the path messages PM3, PM4, and the reservation messages RM3, RM4 of FIG. 16. FIG. 17B shows how the path state, the reservation state, and the binding cache are generated in the router R1 among the states shown by reference characters ST70-ST76 in FIG. 17A.

The states shown by reference character ST70 and ST71 respectively in FIGS. 17A and 17B are states after the completion of the above-mentioned operation shown in FIGS. 14, 15A, and 15B.

The mobile node MN is triggered in operation by the movement from under the router R2 to under the router R3 to transmit a binding update BU to the virtual home agent VHA. The virtual home agent VHA having received the binding update BU from the mobile node MN, updates the binding cache managed by the node itself (see reference character ST72 in FIG. 17A), and notifies the movement of the mobile node MN to the router R1 by the cache notification C2.

The router R1 having received the cache notification C2 updates the binding cache associated with the mobile node MN (see reference character ST73 in FIG. 17A). Also, the router R1 is triggered in operation by the reception of the cache notification C2 to retrieve the binding cache with the home address of the mobile node MN registered in the binding cache (at step S201 in FIG. 2B).

In this case, since the home address of the mobile node MN exists in the binding cache, the router R1 then retrieves the path state in which the destination address is the home address of the mobile node MN. Since the path state also exists, the router R1 then retrieves the reservation state in which the destination address is the care-of address of the mobile node MN (CoA under router R3) (at steps S202-S205 in FIG. 2B).

At this moment, the reservation state in which the destination address is the care-of address of the mobile node MN (CoA under router R3) does not exist yet (see S206 in FIG. 2B). Therefore, the router R1 generates a path state in which the destination address is the care-of address of the mobile node MN and the PHOP is the address of the node itself (address of router R1) (at step S207 in FIG. 2B, see the lowermost row of reference character ST73 in FIG. 17B). The information of the resource reservation in this case is copied from the path state in which the destination address is the home address of the mobile node MN (see the uppermost row of reference character ST73 in FIG. 17B).

The router R1 transmits a path message PM3 in a non-capsulated state to the care-of address of the mobile node MN by the information of the newly generated path state (at steps S208 and S209 in FIG. 2B).

The path message PM3 destined for the care-of address of the mobile node MN is analyzed in the router R3 on the way, whereby the path state is generated by router R3 as shown by reference character ST74 in FIG. 17A. The router R3 changes the PHOP of the path message PM3 into the address of the node itself (address of router R3), and transmits a path message PM4 to the mobile node MN located under the router R3.

The mobile node MN having received the path message PM4 transmits a reservation message RM3 to the PHOP (address of router R3) within the path message. The router R3 having received the reservation message RM3 generates a reservation state, or makes a resource reservation, as shown by reference character ST75 in FIG. 17A, and transfers a reservation message RM4 to the PHOP (address of router R1) in the path state held by the node itself.

The router R1 having received the reservation message RM4 generates a reservation state, or makes a resource reservation in which the destination address is the care-of address (CoA under router R3) of the mobile node MN as shown in the lowermost row of reference character ST76 in FIG. 17B. The router R1 retrieves an entry wherein the destination address is the care-of address under the router R3 from the path state held by the node itself. Since the PHOP is the same as the node itself, the home agent HA does not transfer the reservation message.

By the above-mentioned operation, the resource reservation in the router R2 is made possible.

[2] Application Example to IP-VPN

For the application example [2], the IP-VPN (embodiment (4)), and the IP-VPN considering the case where a plurality of users share a tunnel (embodiment (5)) can be mentioned.

Embodiment 4

FIGS. 18, 19A, 19B, and 19C show a resource reservation procedure in case of the IP-VPN as the resource reservation in the embodiment (4) of the present invention.

Figure 18:
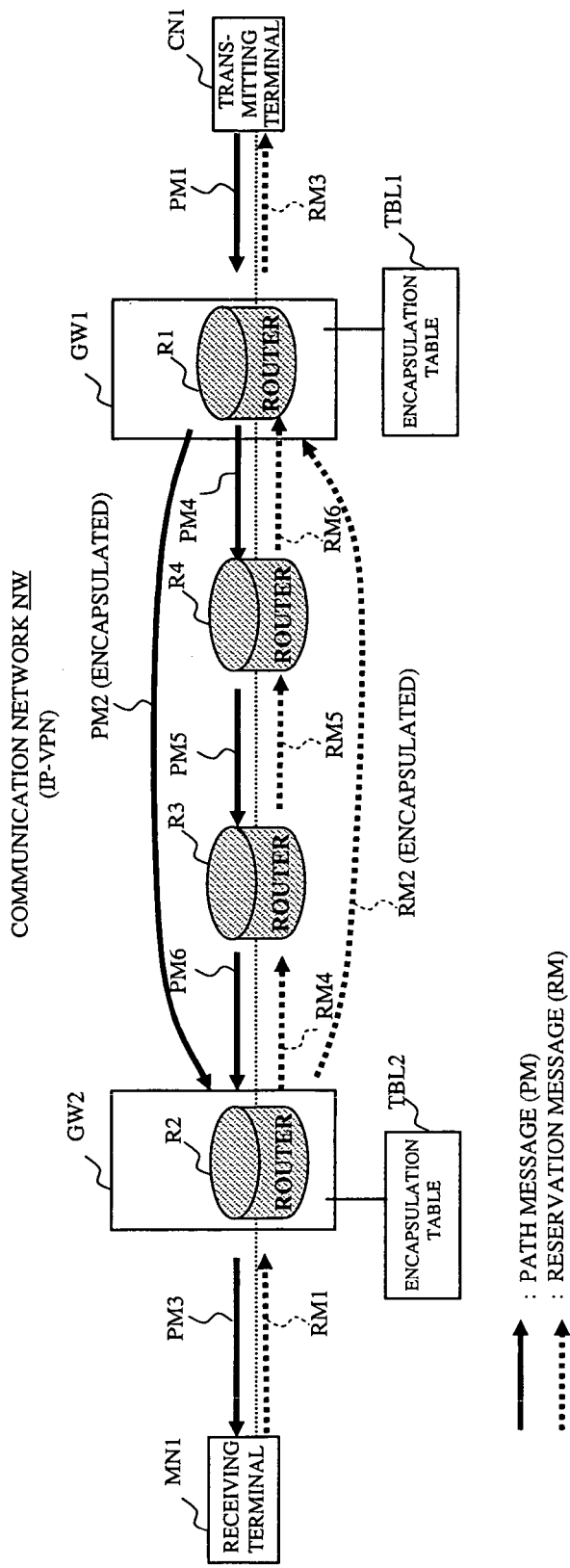
FIG. 18 is a network diagram showing a resource reservation of embodiments (4) and (5) according to the present invention.
Figure 32:
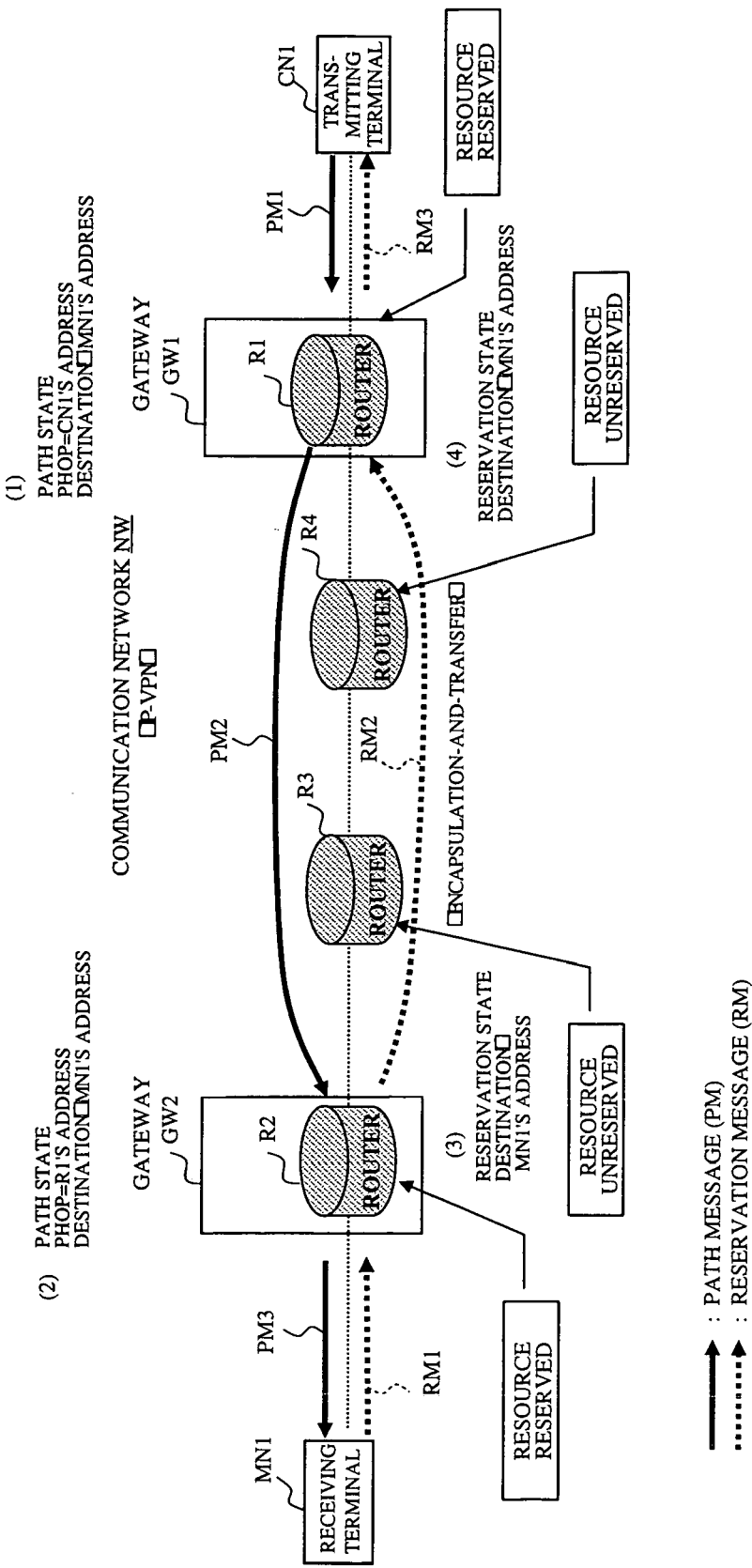
FIG. 32 is a network diagram showing an example (2) wherein a route without a resource reservation is generated by the prior art resource reservation method.

The arrangement of the communication network NW in FIG. 18 is the same as that shown in FIG. 32. Also, the path messages PM1-PM3 and the reservation messages RM1-RM3 for making the resource reservation shown in FIG. 18 are the same as those in the conventional resource reservation procedure shown in FIG. 32.

However, path messages PM4-PM6 and reservation messages RM4-RM6 are inserted between the routers R1 and R2 in FIG. 18.

Figure 19:
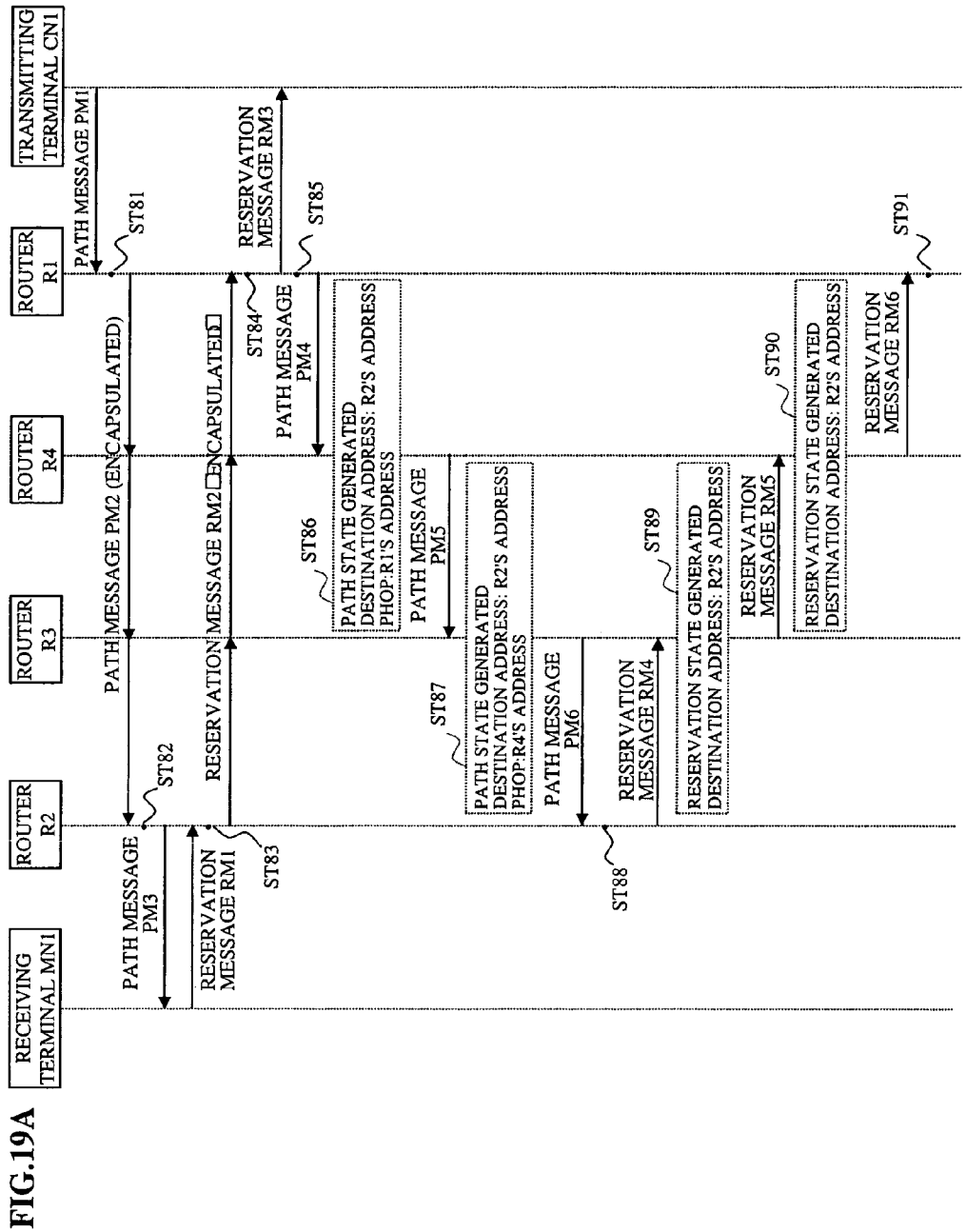
FIG. 19A is a diagram showing a message sequence of an embodiment (4) according to the present invention.
FIG. 19B is a table showing a state of a router R2.
FIG. 19C is a table showing a state of a router R1.

FIG. 19A shows the message sequence of the path messages PM1-PM6 and the reservation messages RM1-RM6 shown in FIG. 18. FIGS. 19B and 19C respectively show how the path state and the reservation state are generated in the routers R2 and R1 among the states shown by reference characters ST81-ST91 in FIG. 19A.

In this embodiment (4), the router R1 receiving the path message PM1 from the transmitting terminal CN1 is triggered in operation by the reception of the reservation message RM2 to perform the proxy RSVP processing in the same way as the home agent HA in the above-mentioned embodiment (1).

Therefore, the router R1 generates a path state in which the destination address is the encapsulated destination address (address of router R2) associated with the address of the second host MN1, and the PHOP is the address of the node itself (address of router R1) as shown by reference character ST85 in FIG. 19C, and transmits a path message PM4 destined for the address of the router R2.

As shown in FIG. 19A, the routers R4 and R3 respectively generate the path states of reference characters ST86 and ST87 by the path message PM4, and transfer the path message as path messages PM5 and PM6, respectively.

The router R2 having received the path message PM6 generates a path state as shown in the lower row of reference character ST88 in FIG. 19B, and transmits a reservation message RM4 to the router R3 that is the PHOP.

As shown in FIG. 19A, the routers R3 and R4 respectively generate the reservation states of reference characters ST89 and ST90 by the reservation message RM4, and transfer the reservation messages RM5 and RM6.

The router R1 having received the reservation message RM6 generates a reservation state, or makes a resource reservation in which the destination address is the address of the router R2 as shown in the lower row of reference character ST91 in FIG. 19C. The router R1 retrieves an entry wherein the destination address is the address of the router R2 from the path state held by the node itself. Since the PHOP is the same as the node itself, the router R1 does not transfer the reservation message.

By the above-mentioned operation, the resource reservation in the tunnel section between the routers R1 and R2, which includes the routers R3 and R4, is made possible.

Figure 28A:
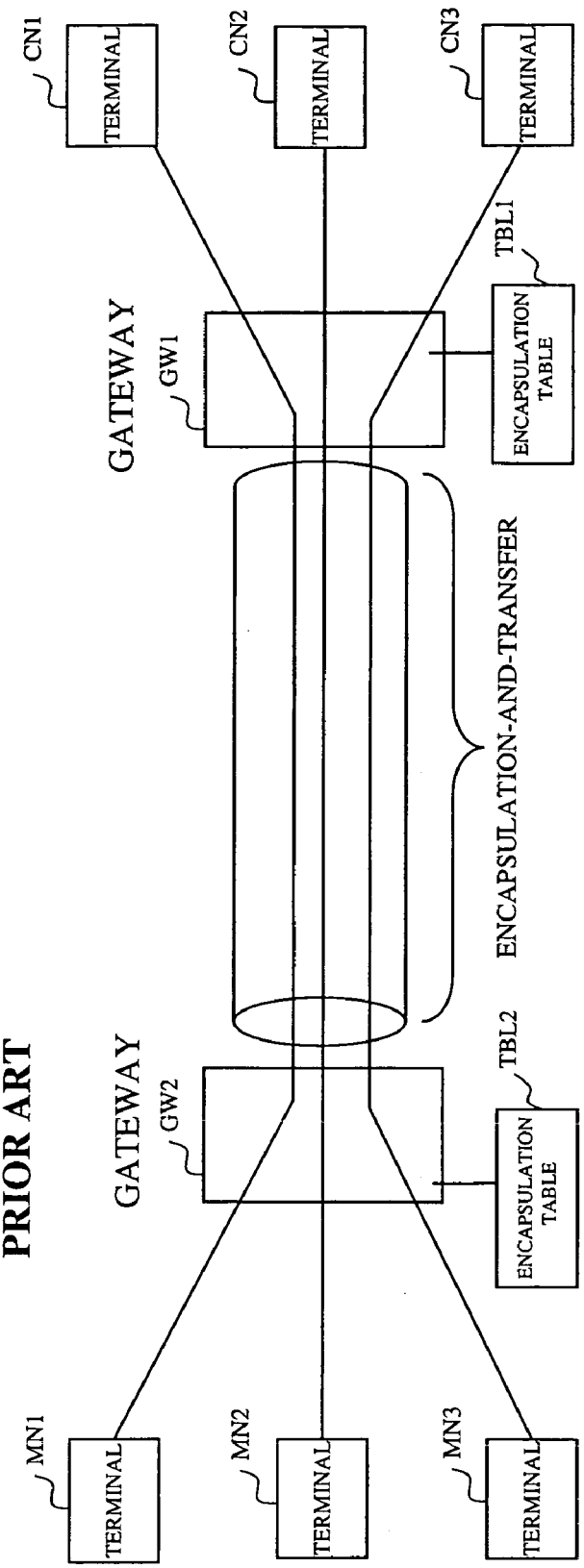
FIGS. 28A and 28B are diagrams illustrating a tunnel mode of a general IPsec.
Figure 28B:
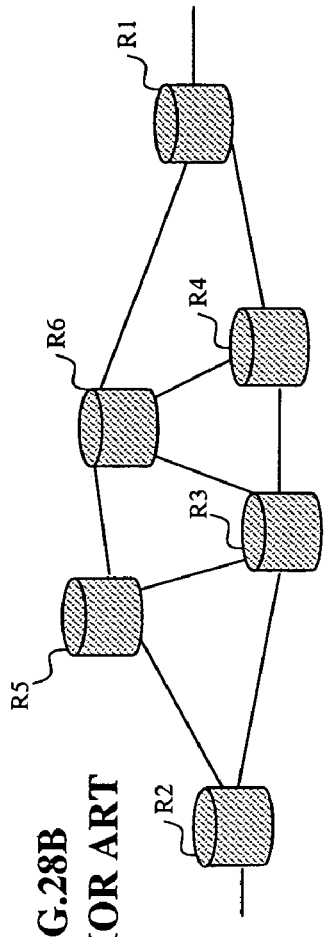

However, while there is no problem with the present embodiment (4) when only the transmitting terminal CN1 and the second host MN1 occupy the above-mentioned tunnel section, there is a problem when a plurality of users such as the transmitting terminals CN1-CN3 and the second hosts MN1-MN3 share the above-mentioned tunnel section as shown in FIG. 28, that the resource reservation is required to be made so as to ensure the service quality requested between the respective pair of users.

Embodiment 5

The embodiment (5) solves the above-mentioned problem in the above-mentioned embodiment (4) by considering the case where a plurality of users share the tunnel.

Figures 20, 21:
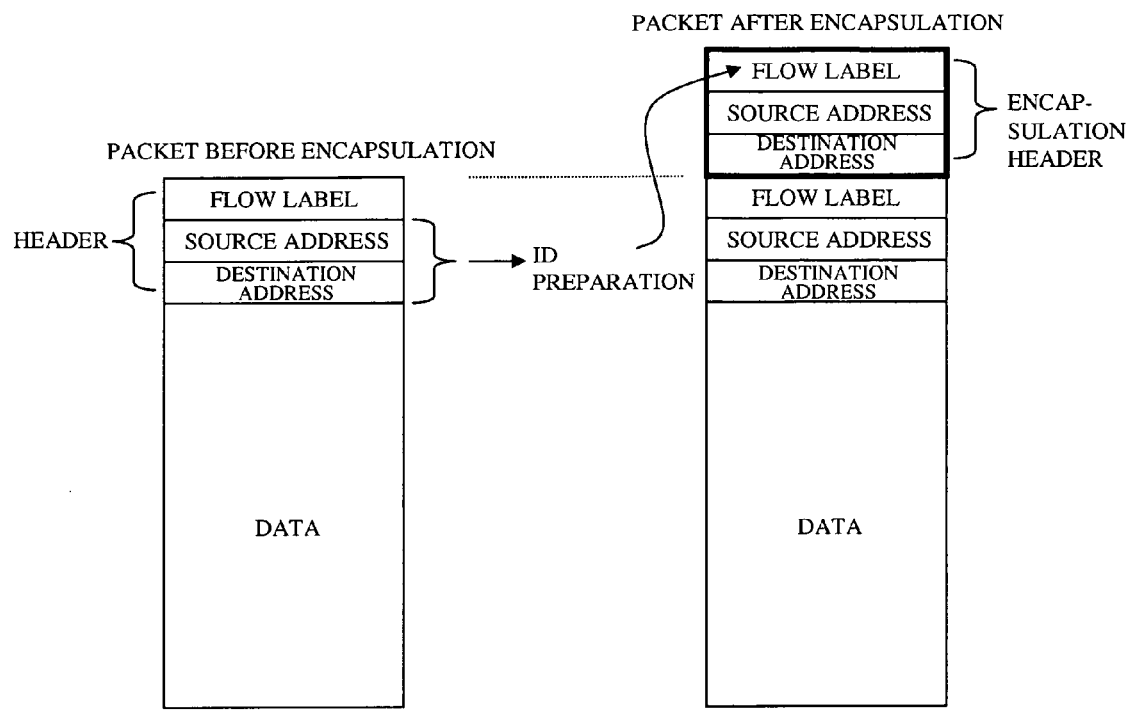
FIG. 20 is a diagram illustrating an application example of an identifier ID in an embodiment (5) according to the present invention.
FIG. 21 is a diagram showing an example of an encapsulation table in an embodiment (5) according to the present invention.

In the present embodiment (5), a router performing the encapsulation of packet, e.g. the router R1 in FIG. 18, prepares an identifier ID for identifying a packet attribute (combination of source address, destination address, protocol number, and the like) before encapsulation, and embeds the identifier ID in an encapsulation header to transmit the packet after encapsulation as shown in FIG. 20.

Therefore, an encapsulation table as shown in FIG. 21 is used in this embodiment (5). The table of the FIG. 21 is one having the information of the identifier ID added to the encapsulation table of FIG. 29.

Figure 22B:
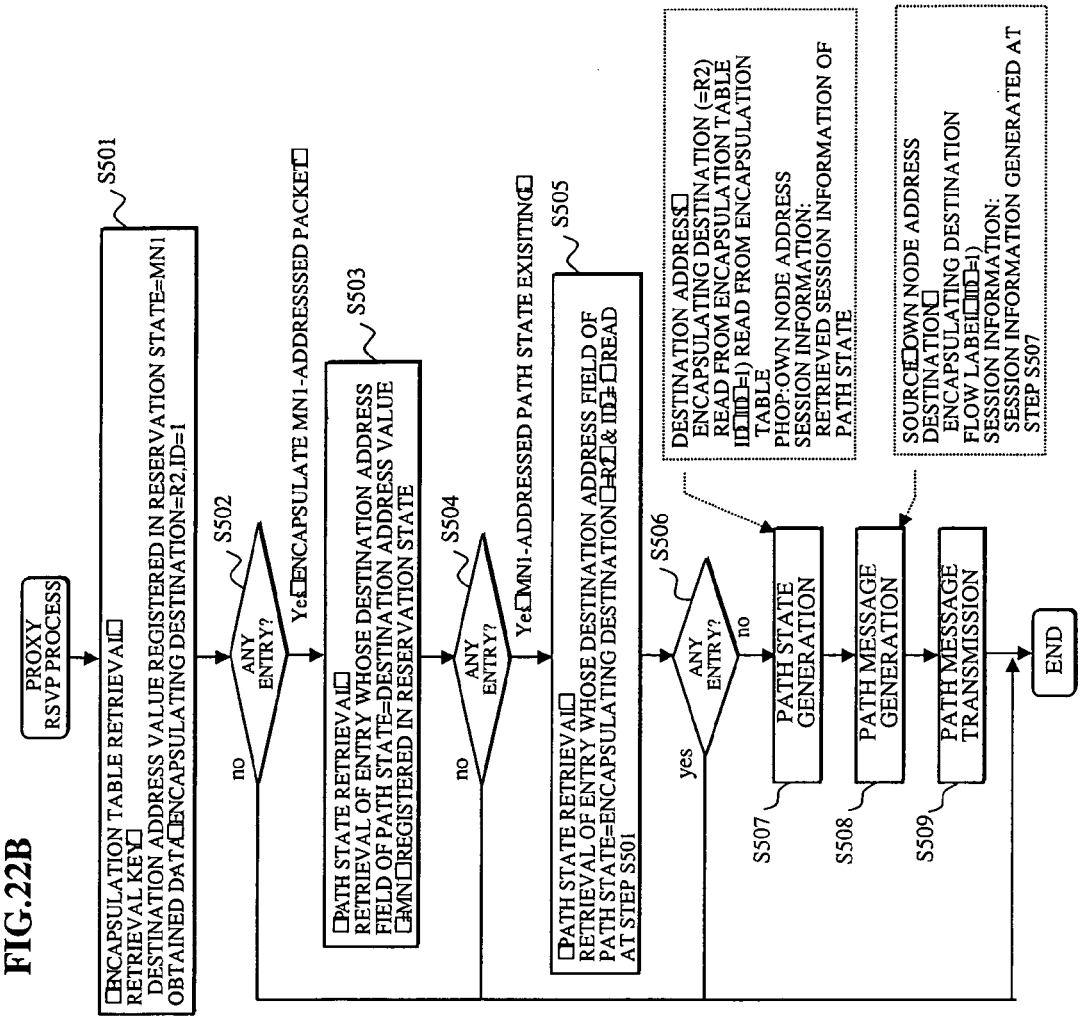
FIGS. 22A and 22B are flow charts showing a processing flow of a router R1 in an embodiment (5) according to the present invention.
Figure 22A:
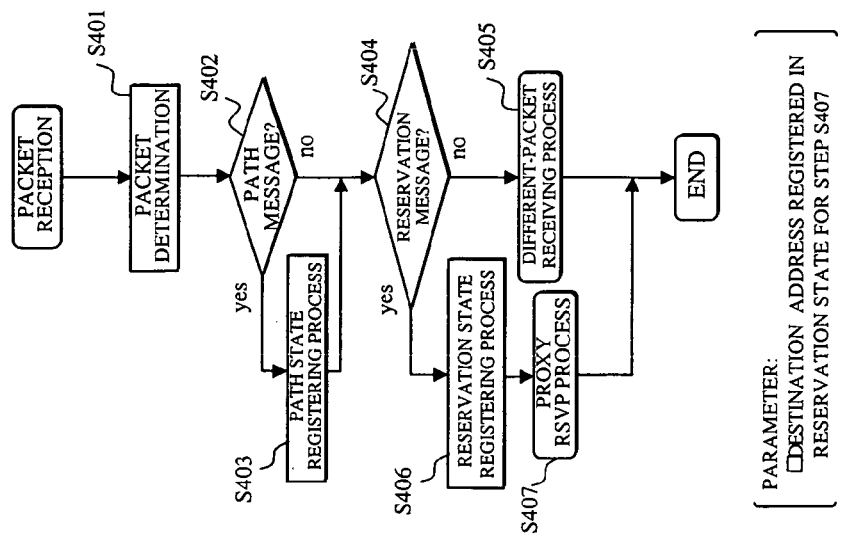

FIGS. 22A and 22B show the processing flow of the router R1 in this embodiment (5). FIG. 22A shows an overall packet reception flow, and FIG. 22B shows the proxy RSVP processing flow. In case of the IP-VPN, different from the mobile IP, there is no location registering processing by the second host, so that the packet reception flow shown in FIG. 22A (at steps S401-S407) is a processing where steps S102, S109, and S110 related to the binding update shown in FIGS. 2A and 8A are omitted.

Namely, upon receiving a packet, the router R1 firstly determines the packet (at step S401). Then, the router R1 performs the path state registration process (at steps S402 and S403) when the received packet is a path message, performs the reservation state registration process (at steps S404 and S406) when the received packet is a reservation message, and further performs the proxy RSVP processing (at step S407). Also, if the received packet is the different packet, the router R1 performs the different-packet receiving process (at step S405).

Hereinafter, the proxy RSVP processing by the router R1 in this embodiment (5) will be described referring to FIG. 22B.

Firstly, at step S501 in FIG. 22B, the encapsulation table (see FIG. 21) is retrieved using the destination address (address of the second host MN1) registered in the reservation state as the parameter.

In this case, the data of the address of router R2 and ID=1 can be obtained respectively as the encapsulated destination and the identifier ID. Therefore, it is determined at step S502 that an entry exists, so that the routine proceeds to step S503, to retrieve the entry wherein the destination address of the path state is the destination address registered in the reservation state (address of the second host MN1).

Since the path state in which the destination address is the address of the second host MN1 exists, it is determined at step S504 that an entry exists, so that at step S505, an entry wherein the destination of the path state is the encapsulated destination (address of router R2) obtained by the above-mentioned step S501, and the identifier ID=1

In the absence of the entry at step S506, the router R1 generates a path state, prepares a path message, and transmits the path message (at steps S507-S509).

It is to be noted that in the path state generated at step S507, the destination address and the identifier are the encapsulated destination (address of router R2) and ID=1 respectively read from the encapsulation table, the PHOP is the address of the node itself (address of router R1), and the session information indicates the path state retrieved.

Also, in the path message prepared at step S508, the source is the address of the node itself (address of router R1), the destination address is the encapsulated destination (address of router R2), a flow label is ID(=1), and the session information indicates the path state generated at step S507.

In this case, the resource reservation in this embodiment (5) is also made by the path messages PM1-PM6 and the reservation messages RM1-RM6 as shown in FIG. 18, in the same way as in the embodiment (4).

Figure 23A:
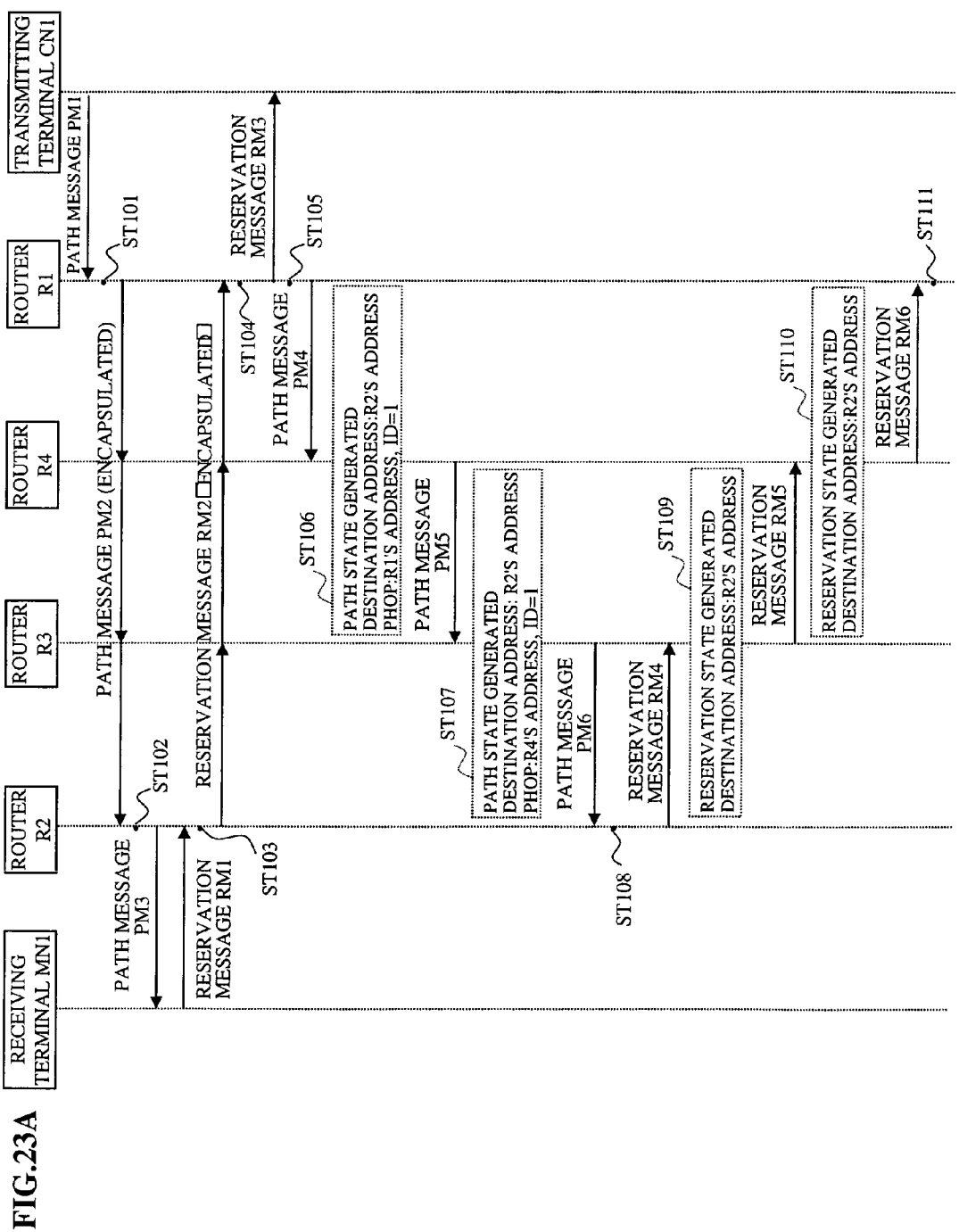
FIG. 23A is a diagram showing a message sequence of an embodiment (5) according to the present invention.
Figure 24:
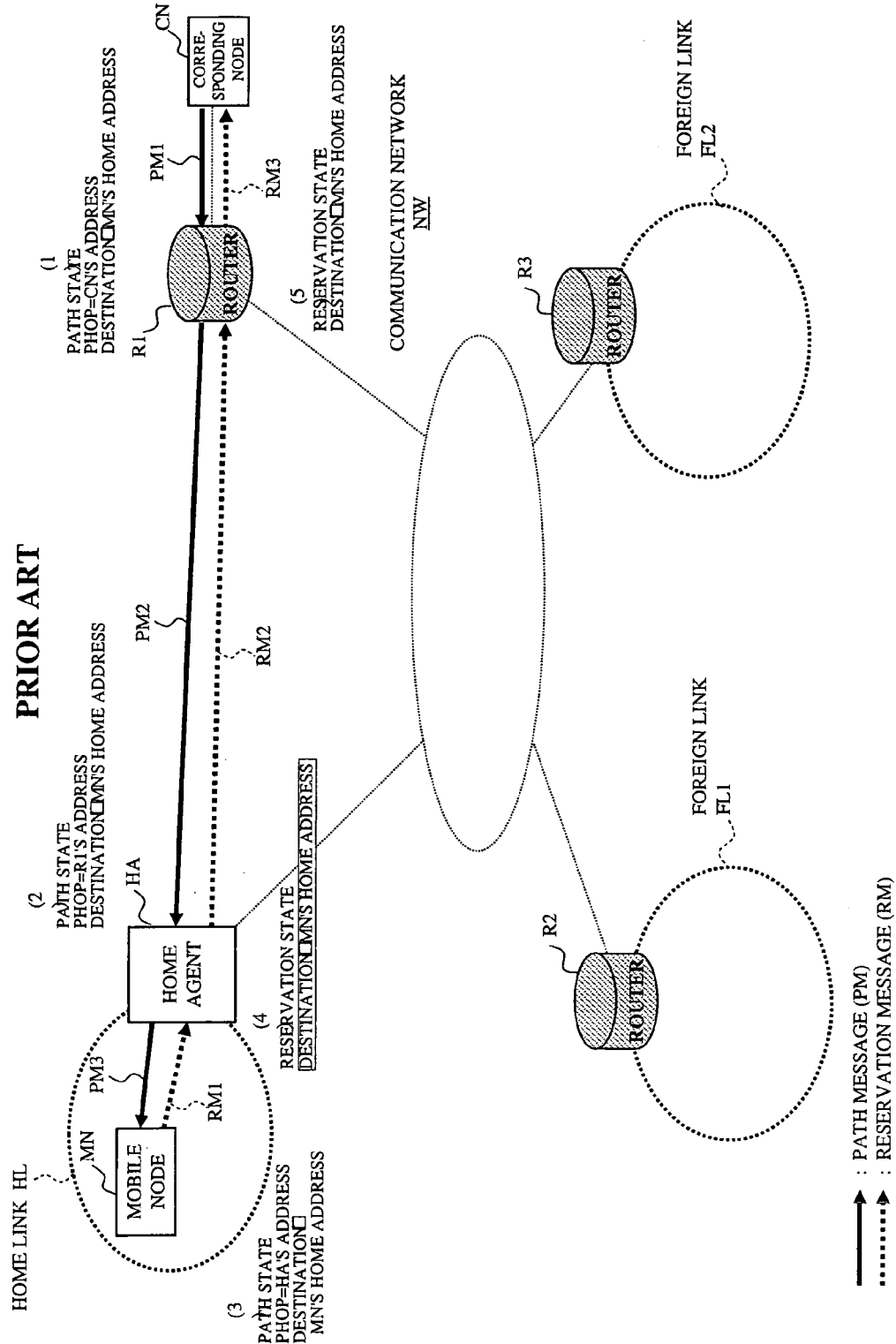
FIG. 24 is a network diagram showing a resource reservation example by a general RSVP.
Figure 25:
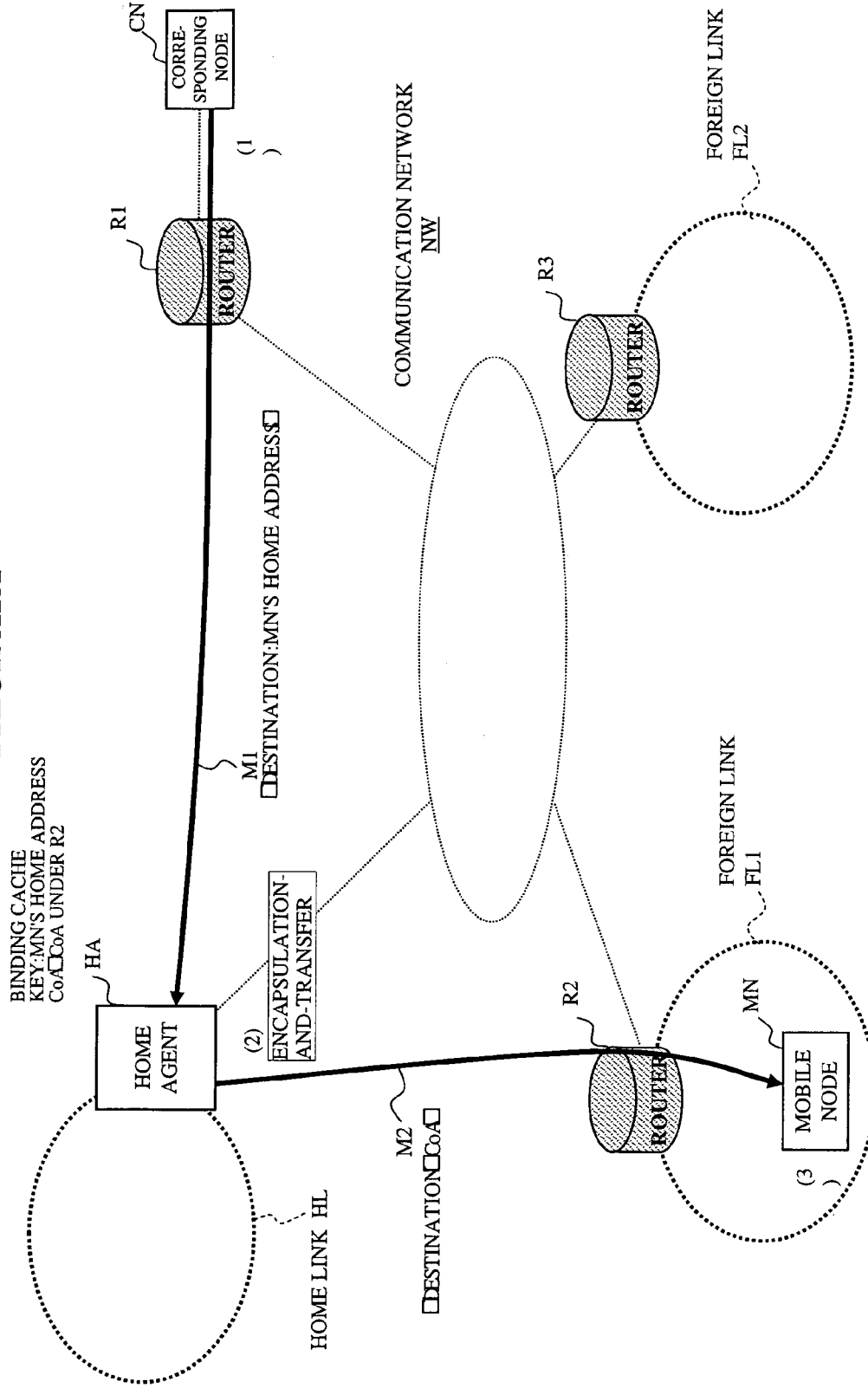
FIG. 25 is a network diagram showing an encapsulation-and-transfer example in a general mobile IP.

Also, FIG. 23A shows the message sequence in this embodiment (5), which is the same as that shown in FIG. 19A, except that the information of the identifier (ID=1) is added to the path state generated in the routers R4 and R3 respectively in reference characters ST106 and ST107 of FIG. 23A. Also, FIGS. 23B and 23C show the path states respectively having the information of the identifier added to those shown in FIGS. 19B and 19C.

Thus, by encapsulating and transferring a packet with the identifier ID, the routers within the encapsulation-and-transfer section (routers R3 and R4 in FIG. 18) are enabled to identify a packet per user, so that with regard to the resource reservation, it becomes possible to make a resource reservation per each identifier ID.

It is to be noted that in the above-mentioned embodiments (1)-(5), the routers performing the proxy RSVP processing (including home agent HA, mobility agent MA, edge node EN) transfer the reservation message for the ordinary RSVP processing before performing the proxy RSVP processing. However, such reservation message for the ordinary RSVP processing may be held until the proxy RSVP processing is completed, or an error message may be transmitted instead of the reservation message in case the proxy RSVP processing has failed.

For example, the timing at which the home agent HA transfers the reservation message RM2 in FIG. 4A may be set after the reception of the reservation message RM5.

Also, in the above-mentioned embodiments (1)-(5), the routers performing the proxy RSVP may be triggered in operation by the reception of the path message from the corresponding terminal to perform the proxy RSVP processing within the encapsulation-and-transfer section if the destination within the encapsulation-and-transfer section is preliminarily known.

As described above, a router and a communication network system according to the present invention is arranged such that a router stores an encapsulated destination address associated with an address of a second host upon encapsulating and transferring a packet addressed to the second host, transfers a first path message transmitted from a first host to make a resource reservation in compliance with a resource reservation protocol, obtains thereafter the encapsulated destination address from the address of the second host, and transmits a second path message in a non-capsulated state to make a resource reservation with the same communication quality as that of the first path message to the encapsulated destination address. Therefore, it is made possible to make a resource reservation in a section where a packet is encapsulated.

What we claim is:

1. A router comprising:
   transferring means for transferring a first path message transmitted from a first host to a second host to make a resource reservation in compliance with a resource reservation protocol, and a first reservation message transmitted from the second host to the first host in response to the first path message;
   storage means for storing an encapsulated destination address associated with an address of the second host upon encapsulating and transferring a packet addressed to the second host; and
   proxy resource reservation means for obtaining the encapsulated destination address from the address of the second host, and for transmitting a second path message in a non-capsulated state to make a resource reservation with a same communication quality as that of the first path message to the encapsulated destination address.

2. The router as claimed in claim 1 wherein the second host comprises a mobile node.

3. The router as claimed in claim 2 wherein the mobile node comprises a mobile terminal including a portable terminal, a notebook-type terminal, or a fixed-type terminal.

4. The router as claimed in claim 2 wherein when the storage means newly store or update the encapsulated destination address in association with the address of the second host by receiving a location registering message from the second host after the resource reservation between the first and the second host is made, the proxy resource reservation means transmit the second path message in a non-capsulated state to the encapsulated destination address newly stored or updated.

5. The router as claimed in claim 2 wherein the transferring means transfer the second path message transmitted by another router and a second reservation message in response to the second path message, the storage means store the encapsulated destination address and a re-encapsulated destination address associated with the address of the second host, and the proxy resource reservation means obtain the re-encapsulated destination address from the encapsulated destination address, and transmit a third path message in a non-capsulated state to make a resource reservation with a same communication quality as that of the second path message to the re-encapsulated destination address.

6. The router as claimed in claim 5 wherein when the storage means update the re-encapsulated destination address stored in association with the address of the second host by receiving a location registering message from the second host after the resource reservation is made between the first and the second host, the proxy resource reservation means resend the third path message in a non-capsulated state to the updated re-encapsulated destination address.

7. The router as claimed in claim 2 wherein the router is provided in a position nearer to the first host, and after receiving information associating the address of the second host with the encapsulated destination address as a cache notification from another router, the router encapsulates and transfers a packet addressed to the second host to the encapsulated destination address, and when the cache notification is received after the resource reservation between the first and the second host is made, the proxy resource reservation means transmit the second path message in a non-capsulated state to the encapsulated destination address.

8. The router as claimed in claim 7 wherein the router requests the other router to transmit the cache notification.

9. The router as claimed in claim 7 wherein the other router transmits the cache notification upon receipt of a location registering message from the second host.

10. The router as claimed in claim 1 wherein upon storing a same encapsulated destination address associated with a plurality of the second host addresses, the storage means store an identifier capable of uniquely identifying an attribute of a received packet per address of each second host in combination with the same encapsulated destination address, and the transferring means and the proxy resource reservation means respectively include the identifier in an encapsulation header upon encapsulating and transferring the received packet and in the second path message.

11. The router as claimed in claim 10 wherein another router makes the resource reservation per identifier based on the identifier.

12. The router as claimed in claim 1 wherein the resource reservation protocol comprises an RSVP.

13. The router as claimed in claim 1 wherein the router does not transfer but holds the first reservation message until a second reservation message in response to the second path message is received.

14. The router as claimed in claim 1 wherein the router transmits an error message, when a resource reservation by the second path message has failed, for notifying that the resource reservation was not made, instead of transferring the first reservation message.

15. The router as claimed in any one of claims 4, 6, and 7 wherein the proxy resource reservation means determine whether or not the resource reservation between the first and the second host is made based on a generation state of a path state generated by the transferring means upon receipt of the first or the second path message, or of a reservation state generated by the transferring means upon receipt of the first or the second reservation message.

16. A communication network system comprising:
a first host for transmitting a first path message to make a resource reservation in compliance with a resource reservation protocol;
a second host for transmitting a first reservation message to the first host in response to the first path message; and
a first router for storing an encapsulated destination address associated with an address of the second host upon encapsulating and transferring a packet addressed to the second host, for obtaining the encapsulated destination address from the address of the second host, and for transmitting a second path message in a non-capsulated state to make a resource reservation with a same communication quality as that of the first path message to the encapsulated destination address.

17. The communication network system as claimed in claim 16 wherein the second host comprises a mobile node.

18. The communication network system as claimed in claim 17 wherein the mobile node comprises a mobile terminal including a portable terminal, a notebook-type terminal, or a fixed-type terminal.

19. The communication network system as claimed in claim 17 wherein when newly storing or updating the encapsulated destination address in association with the address of the second host by receiving a location registering message from the second host after the resource reservation between the first and the second host is made, the first router transmits the second path message in a non-capsulated state to the encapsulated destination address newly stored or updated.

20. The communication network system as claimed in claim 17, further comprising a second router provided on a route where a packet addressed to the encapsulated destination address is re-encapsulated and transferred to the second host, for storing the encapsulated destination address and a re-encapsulated destination address associated with the address of the second host when the packet is re-encapsulated and transferred, for obtaining the re-encapsulated destination address from the encapsulated destination address, and for transmitting a third path message in a non-capsulated state to make a resource reservation with a same communication quality as that of the second path message to the re-encapsulated destination address.

21. The communication network system as claimed in claim 20 wherein when the second router updates the re-encapsulated destination address stored in association with the address of the second host by receiving a location registering message from the second host after the resource reservation is made between the first and the second host, the second router transmits the third path message in a non-capsulated state to the updated re-encapsulated destination address.

22. The communication network system as claimed in claim 17, further comprising a second router, provided in a position nearer to the first host, for encapsulating and transferring a packet addressed to the second host to the encapsulated destination address after receiving information associating the address of the second host with the encapsulated destination address as a cache notification from the first router, and for transmitting the second path message in a non-capsulated state to the encapsulated destination address when the cache notification is received after the resource reservation between the first and the second host is made.

23. The communication network system as claimed in claim 22 wherein the first router transmits the cache notification to the second router in response to a request from the second router.

24. The communication network system as claimed in claim 22 wherein the first router transmits the cache notification to the second router upon receipt of a location registering message from the second host.

25. The communication network system as claimed in claim 16 wherein upon storing a same encapsulated destination address associated with a plurality of the second host addresses, the first router stores an identifier capable of uniquely identifying an attribute of a received packet per address of each second host in combination with the same encapsulated destination address, and includes the identifier in an encapsulation header upon encapsulating and transferring the received packet and in the second path message.

26. The communication network system as claimed in claim 25, further comprising a second router for making a resource reservation with the second path message, and for making the reservation per identifier.

27. The communication network system as claimed in claim 16 wherein the resource reservation protocol comprises an RSVP.

28. The communication network system as claimed in claim 16 wherein the first router does not transfer but holds the first reservation message until a second reservation message in response to the second path message is received.

29. The communication network system as claimed in claim 16 wherein the first router transmits an error message, when a resource reservation by the second path message has failed, for notifying that the resource reservation was not made, instead of transferring the first reservation message.

30. The communication network system as claimed in any one of claims 19, 21, and 22 wherein the first router or the second router determines whether or not the resource reservation between the first and the second host is made based on a generation state of a path state generated upon receipt of the first or the second path message, or of a reservation state generated upon receipt of the first or the second reservation message.

* * * * *